US012225592B2

(12) United States Patent
Lei et al.

(10) Patent No.: US 12,225,592 B2
(45) Date of Patent: Feb. 11, 2025

(54) MAPPING ONE PREAMBLE TO MULTIPLE PHYSICAL UPLINK SHARED CHANNEL RESOURCE UNITS FOR TWO-STEP RANDOM ACCESS PROCEDURE

(71) Applicant: QUALCOMM Incorporated, San Diego, CA (US)

(72) Inventors: Jing Lei, San Diego, CA (US); Seyong Park, San Diego, CA (US); Yiqing Cao, Beijing (CN); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 17/594,704

(22) PCT Filed: May 7, 2020

(86) PCT No.: PCT/CN2020/088941
§ 371 (c)(1),
(2) Date: Oct. 26, 2021

(87) PCT Pub. No.: WO2020/238574
PCT Pub. Date: Dec. 3, 2020

(65) Prior Publication Data
US 2022/0210842 A1 Jun. 30, 2022

(30) Foreign Application Priority Data

May 30, 2019 (WO) ................ PCT/CN2019/089292

(51) Int. Cl.
*H04W 56/00* (2009.01)
*H04L 1/00* (2006.01)
(Continued)

(52) U.S. Cl.
CPC ....... *H04W 74/0841* (2013.01); *H04L 1/0003* (2013.01); *H04L 5/0012* (2013.01); *H04W 72/0446* (2013.01); *H04W 74/004* (2013.01)

(58) Field of Classification Search
CPC ......... H04W 74/0841; H04W 72/0446; H04W 74/004; H04L 1/0003; H04L 5/0012
(Continued)

(56) References Cited

U.S. PATENT DOCUMENTS 7,167,942 B1  1/2007 Bishara
8,218,662 B2  7/2012 Choi et al.
(Continued)

FOREIGN PATENT DOCUMENTS

CN  107852757 A  3/2018
CN  107889273 A  4/2018
(Continued)

OTHER PUBLICATIONS

Sheng, User Equipments, Base Stations and Methods, Aug. 22, 2019, WO 2019160814: (Year: 2019).*
(Continued)

*Primary Examiner* — Sai Ming Chan
(74) *Attorney, Agent, or Firm* — Procopio, Cory, Hargreaves & Savitch LLP

(57) ABSTRACT

Aspects are provided to support payloads for msgA transmission in a two-step random access (RACH) procedure by providing a one-to-many mapping arrangement between preambles and physical uplink shared channel (PUSCH) resource units (PRUs). A preamble is determined by the UE which is mapped to one or more groups of PRUs to support piggybacking of uplink control information (UCI), frequency hopping on PUSCH, and multiple-slot repetition for msgA transmissions. By piggybacking UCI to a payload in msgA, flexibility may be provided in the selection of MCS
(Continued)

and waveform as well as resource allocation for demodulation reference signals (DMRS) and PUSCH in PRUs. Moreover, by allowing a payload to hop to different frequencies on PUSCH during the transmission of msgA, a gain in frequency diversity and interference averaging may be provided, and by enabling a payload to repeat across multiple slots in msgA transmission, coverage enhancement and/or reliability may be increased.

57 Claims, 17 Drawing Sheets

(51) Int. Cl.
    *H04L 5/00*           (2006.01)
    *H04W 72/0446*    (2023.01)
    *H04W 74/00*       (2009.01)
    *H04W 74/0833*    (2024.01)

(58) Field of Classification Search
    USPC .......................................................... 370/329
    See application file for complete search history.

(56) References Cited

U.S. PATENT DOCUMENTS

| | | |
|---|---|---|
| 2018/0279186 A1 | 9/2018 | Park et al. |
| 2020/0128585 A1* | 4/2020 | Kuang ................. H04L 5/0094 |
| 2020/0245373 A1* | 7/2020 | Xiong ............... H04W 74/0833 |
| 2022/0015120 A1* | 1/2022 | Qiu ................... H04W 72/1268 |
| 2022/0015156 A1* | 1/2022 | Xu ........................ H04L 5/0051 |

FOREIGN PATENT DOCUMENTS

| | | |
|---|---|---|
| KR | 101502626 B1 | 3/2015 |
| WO | 2018062925 A1 | 4/2018 |
| WO | 2018171394 A1 | 9/2018 |
| WO | 2019074707 | 4/2019 |

OTHER PUBLICATIONS

"Chai, Random Access Method, Device And System, Mar. 24, 2023, CN 115843116" (Year: 2019).*
"Wu, Random Access Method And Communication Device, Oct. 9, 2020, CN 111757528" (Year: 2019).*
"Zhang, A Method And Device Are Used For Node In Wireless Communications, Jun. 2, 2020, CN 111225436" (Year: 2018).*
Qualcomm Incorporated: "Channel Structure for Two-Step RACH", 3GPP TSG-RAN WG1 Meeting #97, R1-1907691, 3rd Generation Partnership Project, Mobile Competence Centre, 650, Route Des Lucioles, F-06921, Sophia-Antipolis, Cedex, France, vol. RAN WG1, No. Reno, USA, May 13, 2019-May 17, 2019, May 16, 2019, XP051739977, 20 Pages, figure 1 paragraph [02.1], paragraph [2.2.2], figure 6, p. 3, paragraphs 2.2, 2.2.2—p. 7, Section 2.1-Section 2.2.
Supplementary European Search Report—EP20815102—Search Authority—The Hague—Jan. 9, 2023.
Taiwan Search Report—TW109115351—TIPO—Oct. 13, 2023.
International Search Report and Written Opinion—PCT/CN2019/089292—ISA/EPO—Feb. 24, 2020.
International Search Report and Written Opinion—PCT/CN2020/088941—ISA/EPO—Jul. 29, 2020.

* cited by examiner

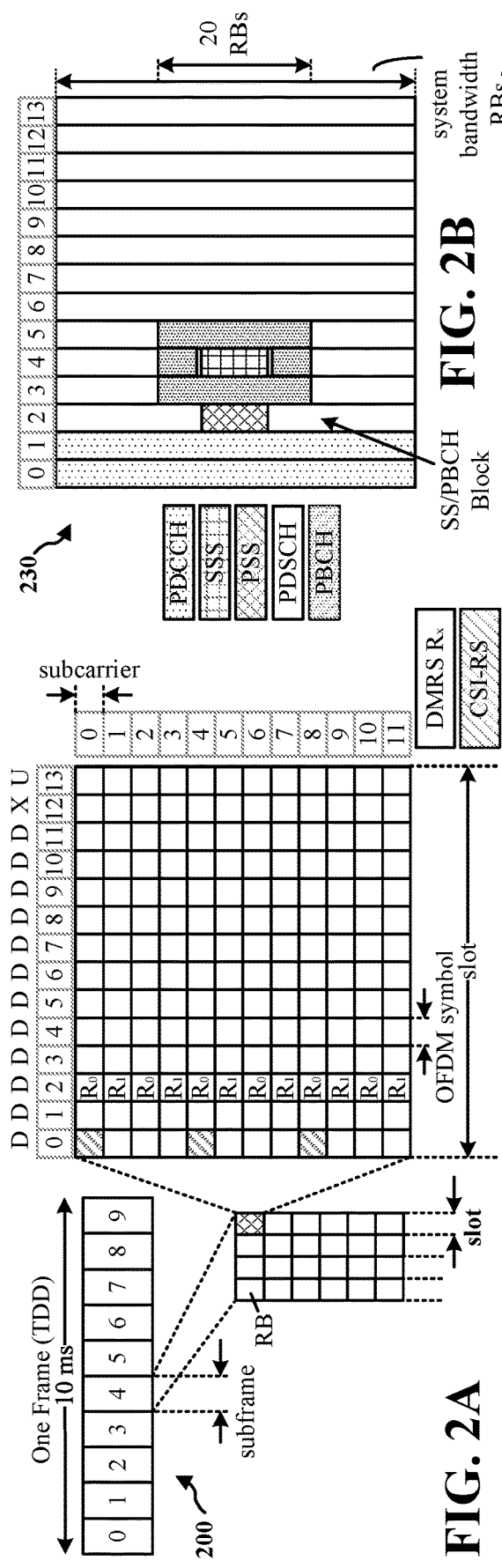
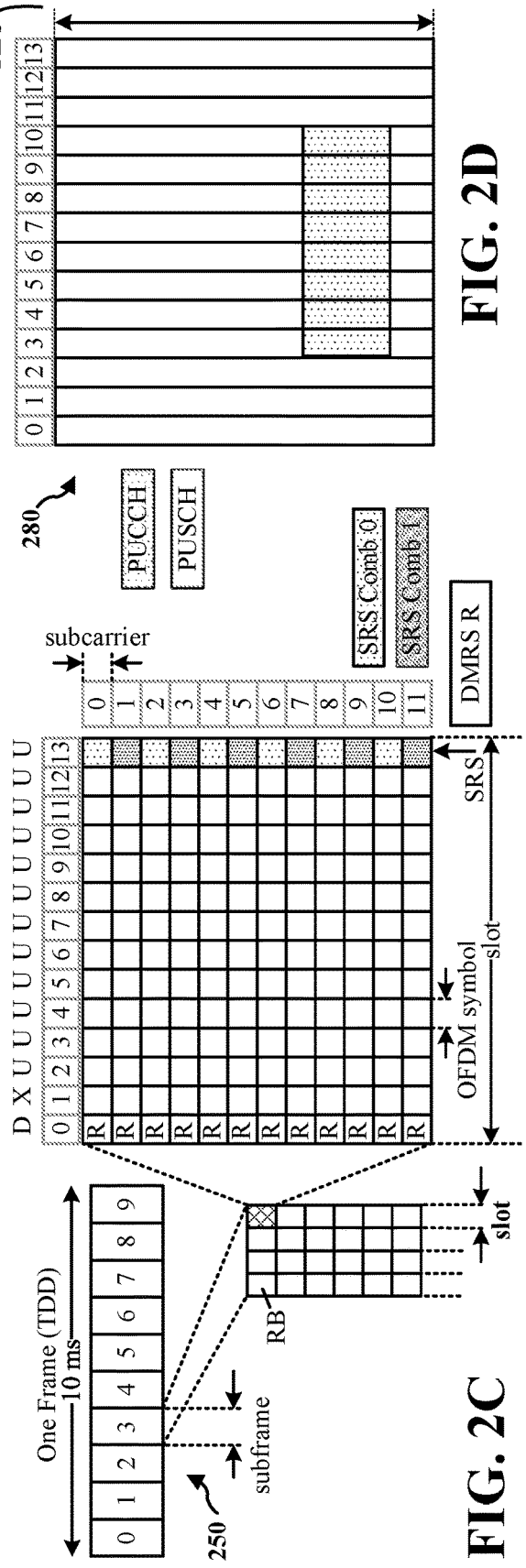
FIG. 2A
FIG. 2B
FIG. 2C
FIG. 2D

MAPPING ONE PREAMBLE TO MULTIPLE PHYSICAL UPLINK SHARED CHANNEL RESOURCE UNITS FOR TWO-STEP RANDOM ACCESS PROCEDURE

CROSS REFERENCE TO RELATED APPLICATION(S)

This application is a National Stage Application filed under 35 U.S.C. § 371 of PCT International Patent Application Serial No. PCT/CN2020/088941, entitled "MAPPING ONE PREAMBLE TO MULTIPLE PHYSICAL UPLINK SHARED CHANNEL RESOURCE UNITS FOR TWO-STEP RANDOM ACCESS PROCEDURE" and filed on May 7, 2020, which claims priority to International Patent Application Serial No. PCT/CN2019/089292, entitled "MAPPING ONE PREAMBLE TO MULTIPLE PHYSICAL UPLINK SHARED CHANNEL RESOURCE UNITS FOR TWO-STEP RANDOM ACCESS PROCEDURE" and filed on May 30, 2019, which is expressly incorporated by reference herein in its entirety.

BACKGROUND

Technical Field

The present disclosure relates generally to communication systems, and more particularly, to a wireless communication system between a base station and a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a contention-based random access (RACH) procedure, four messages are generally provided between a UE and a base station. For example, during an initial attach procedure, a UE may send a preamble to the base station (e.g. message 1), receive a random access response (RAR) from the base station (e.g. message 2), send an RRC Connection Request message or other payload to the base station (e.g. message 3), and receive an RRC Connection Setup message or other transmission subject to contention resolution from the base station (e.g. message 4). This four-step RACH procedure can be simplified into a two-step RACH procedure in which the UE sends a preamble and payload in a first message. For example, in a two-step RACH procedure message A ("msgA") may correspond to messages 1 and 3 of the four-step RACH procedure, and message B ("msgB") may correspond to messages 2 and 4 of the four-step RACH procedure. Thus, in the two-step RACH procedure, the UE may send the preamble followed by the payload in the msgA transmission to the base station, while the base station may send the RAR and the RRC response message in one msgB transmission to the UE.

However, payloads transmitted in msgA of the two-step RACH procedure may have various payload sizes and cell coverage requirements. For example, user plane data may have a larger payload size than radio resource control messages, and a different modulation coding scheme (MCS) for different types of payloads may be necessary. To support this variety of payloads, there is a need for msgA transmission in the two-step RACH procedure to allow for configurable MCS and configurable resource sizes in the time-frequency domain. The present disclosure meets this need by providing a one-to-many mapping arrangement between preambles and physical uplink shared channel (PUSCH) resource units (PRUs). For example, the preamble selected by the UE may be mapped to one or more groups of PRUs. The mapping may support piggybacking of uplink control information (UCI), frequency hopping on PUSCH, and/or multiple-slot repetition for msgA transmissions. By piggybacking UCI to a payload in msgA, the present disclosure may provide flexibility in the selection of MCS and waveform, as well as provide resource allocation for DMRS and PUSCH in PRUs. Moreover, by allowing a payload to hop to different frequencies on PUSCH during the transmission of msgA, a gain in frequency diversity and interference averaging may be provided. Additionally, by enabling a payload to repeat across multiple slots in msgA transmission, coverage enhancement and/or reliability may be increased.

In an aspect of the disclosure, a method, a computer-readable medium, and an apparatus are provided. The apparatus may be a UE. In one aspect, the apparatus receives, from a base station, random access configuration information. The apparatus determines a preamble for a random access message from a preamble group for a random access occasion (RO) based on the random access configuration information. The apparatus determines one or more PRU resource sets for the random access message based on the preamble and a mapping based on the random access configuration information, where the random access configuration information maps the preamble to the one or more PRU resource sets. Then, the apparatus transmits, to the base station, the random access message including the preamble and a payload, where the payload is transmitted using one or more PRU groups of the one or more PRU resource sets based on the mapping.

In another aspect of the disclosure, a method, a computer-readable medium, and an apparatus are provided. The apparatus may be a base station. In one aspect, the apparatus transmits, to a UE, random access configuration information, where the random access configuration information is transmitted using at least one of system information or RRC signaling, and where the random access configuration information includes a mapping of a preamble to one or more PRU resource sets. The apparatus also receives a random access message from the UE including the preamble on a RO, where the preamble is from a preamble group. The random access message includes a payload received in one or more PRU groups of the one or more PRU resource sets based on the mapping.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
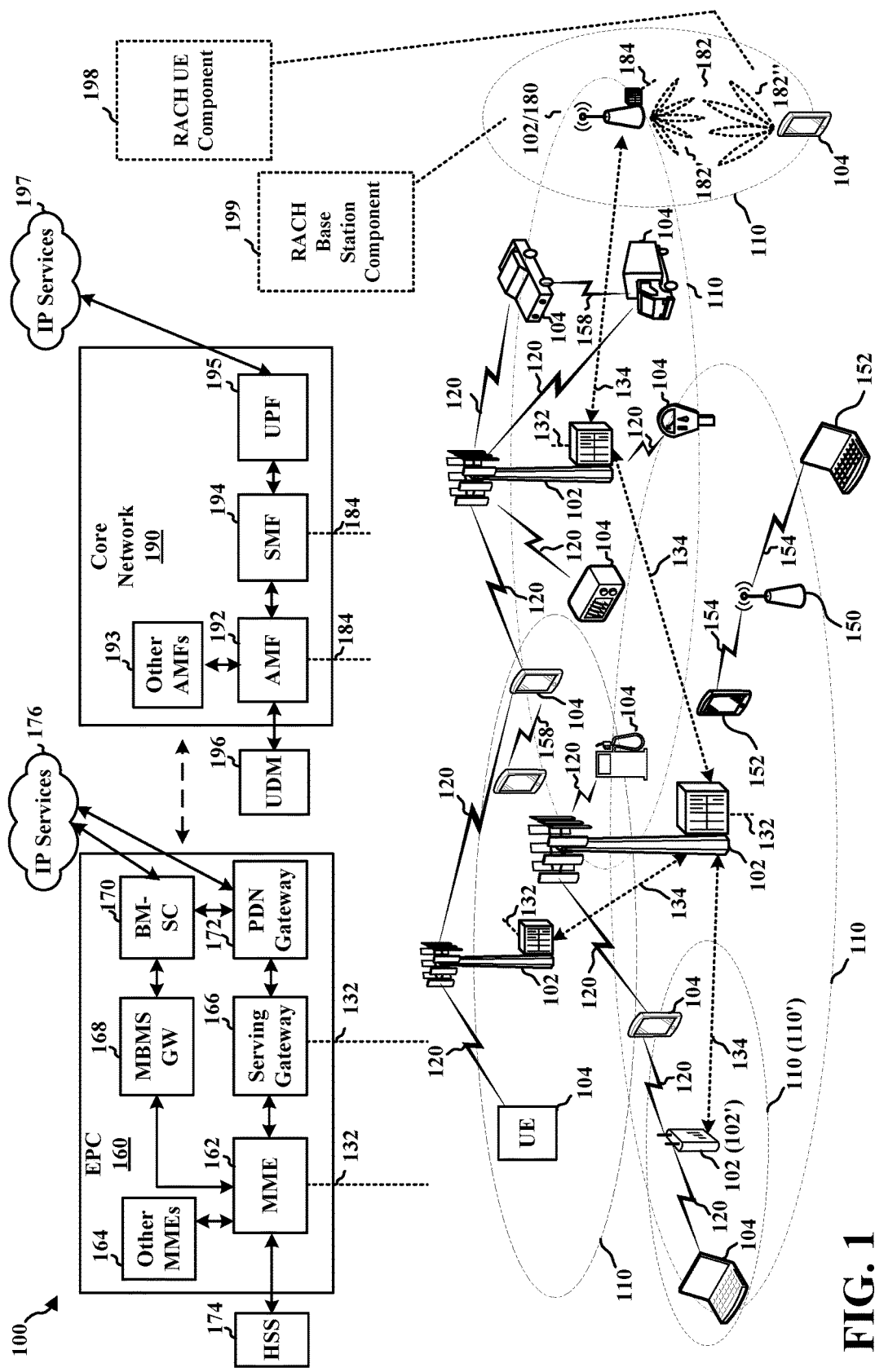
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE

104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a RACH UE component 198, which is configured to receive, from base station 102/180, random access configuration information; determine a preamble for a random access message from a preamble group for a RO based on the random access configuration information; determine one or more PRU resource sets for the random access message based on the preamble and a mapping based on the random access configuration information, where the random access configuration information maps the preamble to the one or more PRU resource sets; and transmit, to the base station, the random access message including the preamble and a payload, where the payload is transmitted using one or more PRU groups of the one or more PRU resource sets based on the mapping.

Still referring to FIG. 1, in other aspects, the base station 102/180 may include a RACH base station component 199, which is configured to transmit, to the UE 104, random access configuration information, where the random access configuration information is transmitted using at least one of system information or RRC signaling, and where the random access configuration information includes a mapping of a preamble to one or more PRU resource sets. The RACH base station component 199 is also configured to receive a random access message from the UE including the preamble on a RO, where the preamble is from a preamble group. The random access message includes a payload received in one or more PRU groups of the one or more PRU resource sets based on the mapping.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$. 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
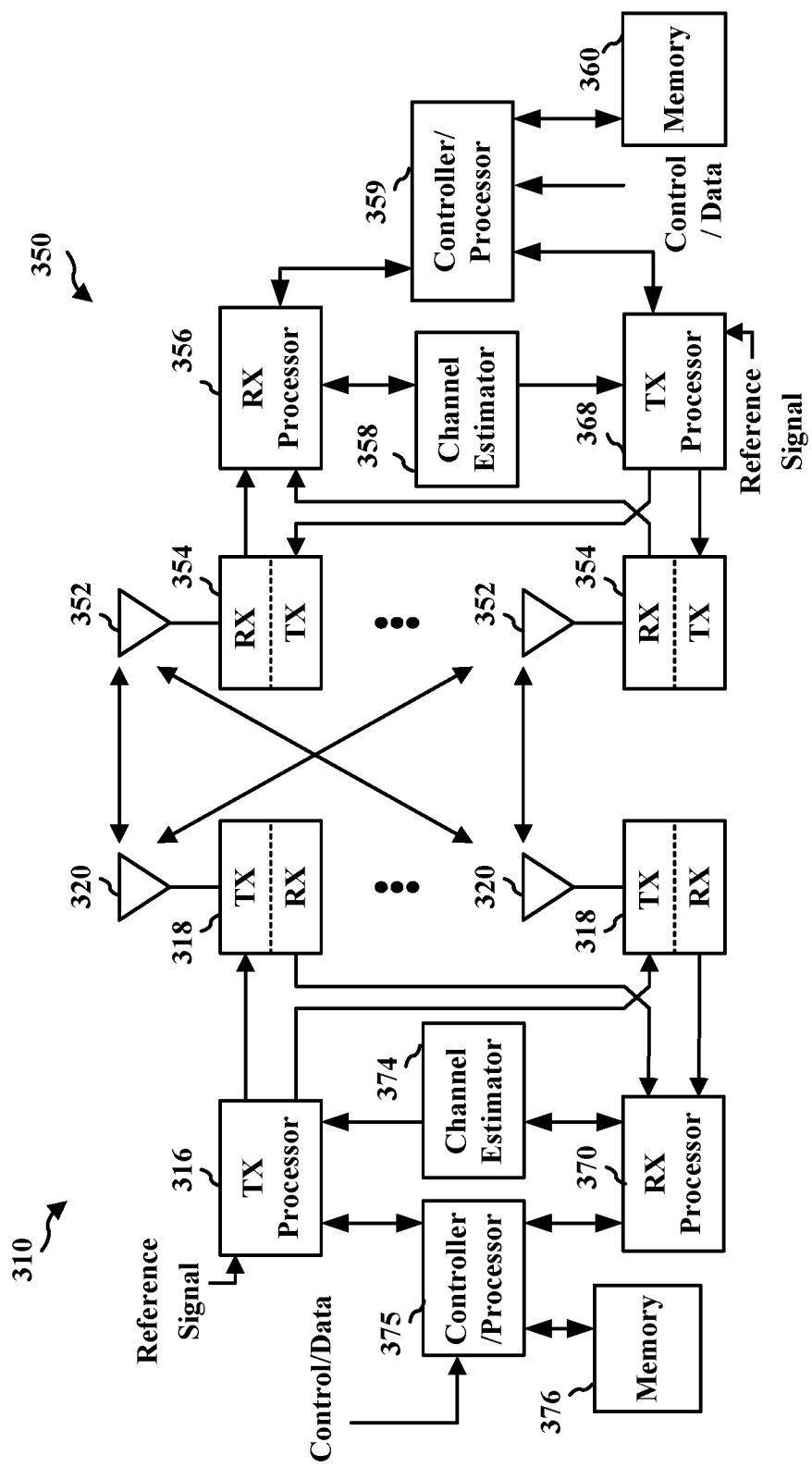
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with RACH UE component 198 of FIG. 1.

At least one of the TX processor 316, the RX processor 370, and the controller/processor 375 may be configured to perform aspects in connection with RACH base station component 199 of FIG. 1.

In a four-step contention-based random access (RACH) procedure, four messages may be provided between a UE and a base station. For example, during an initial attach procedure, a UE may send a preamble to the base station (e.g. message 1), receive a random access response (RAR) from the base station (e.g. message 2), send an RRC Connection Request message or other payload to the base station (e.g. message 3), and receive an RRC Connection Setup message or other transmission subject to contention resolution from the base station (e.g. message 4). This four-step RACH procedure can be simplified into a two-step RACH procedure in which the UE sends a preamble and a payload in a first message. For example, message A ("msgA") of a two-step RACH procedure may correspond to messages 1 and 3 of the four-step RACH procedure, and message B ("msgB") may correspond to messages 2 and 4 of the four-step RACH procedure. Thus, in the two-step RACH procedure, the UE may send the preamble followed by the payload in a msgA transmission to the base station, while the base station may send the RAR and the RRC response message in a msgB transmission to the UE.

Figure 4:
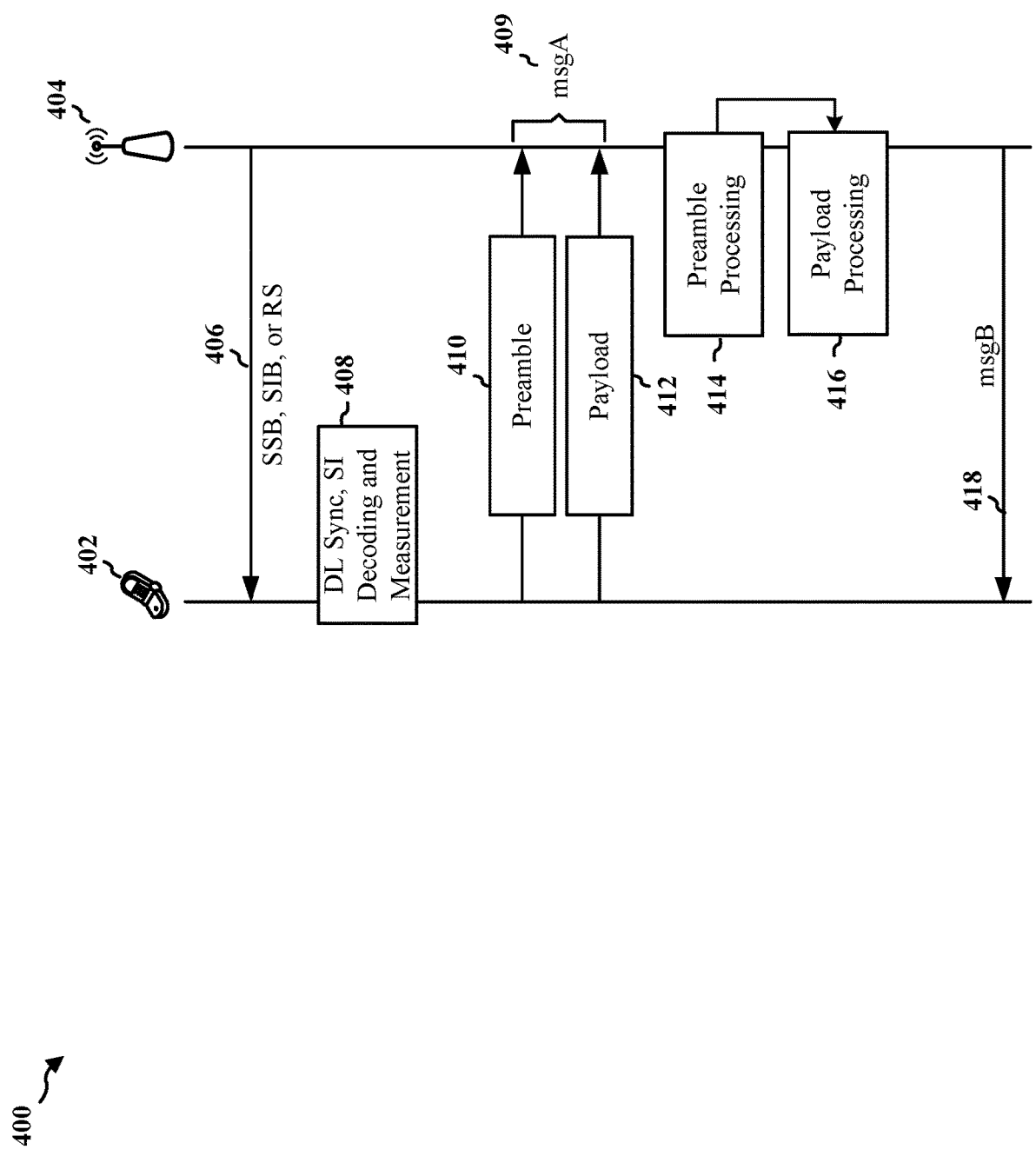
FIG. 4 is a diagram illustrating an example communication flow between a UE and a base station.

FIG. 4 illustrates an example communication flow 400 between a UE 402 and a base station 404 as part of a two-step RACH procedure. Prior to beginning a two-step RACH process, the UE may first receive random access configuration information 406 from the base station. For example, the UE may receive an SSB, a SIB, and/or a reference signal broadcast by the base station. The UE may process these signals and channels and determine the configuration for the two-step RACH. For example, the UE may determine, at 408, any of a downlink synchronization based on at least one of the SSB, SIB, or reference signal; decoding information; or other measurement information for random access with the base station 404.

After the UE obtains the random access configuration information 406, the UE may generate and transmit msgA 409. MsgA 409 is an uplink transmission from the UE 402 to the base station 404 comprising at least two parts: a preamble 410 and a payload 412. Once the UE determines the preamble from a group of preamble sequences in a random access occasion (RO), the UE transmits the preamble 410 to the base station, followed by the payload 412. The payload may include, for example, an RRC message (similar to message 3 in the four-step RACH process), user plane (UP) or control plane (CP) data, a medium access control (MAC) control element (CE) (e.g. buffer status report (BSR) or power headroom report (PHR)), and in certain aspects, piggybacked uplink control information (UCI). A demodulation reference signal (DMRS) may also be transmitted with the payload. When the msgA arrives at the base station, the base station will first process the preamble, at 414, and then the payload, at 416. If the processing of the preamble is successful, the base station 404 may then send msgB 418 to the UE 402.

Figure 5:
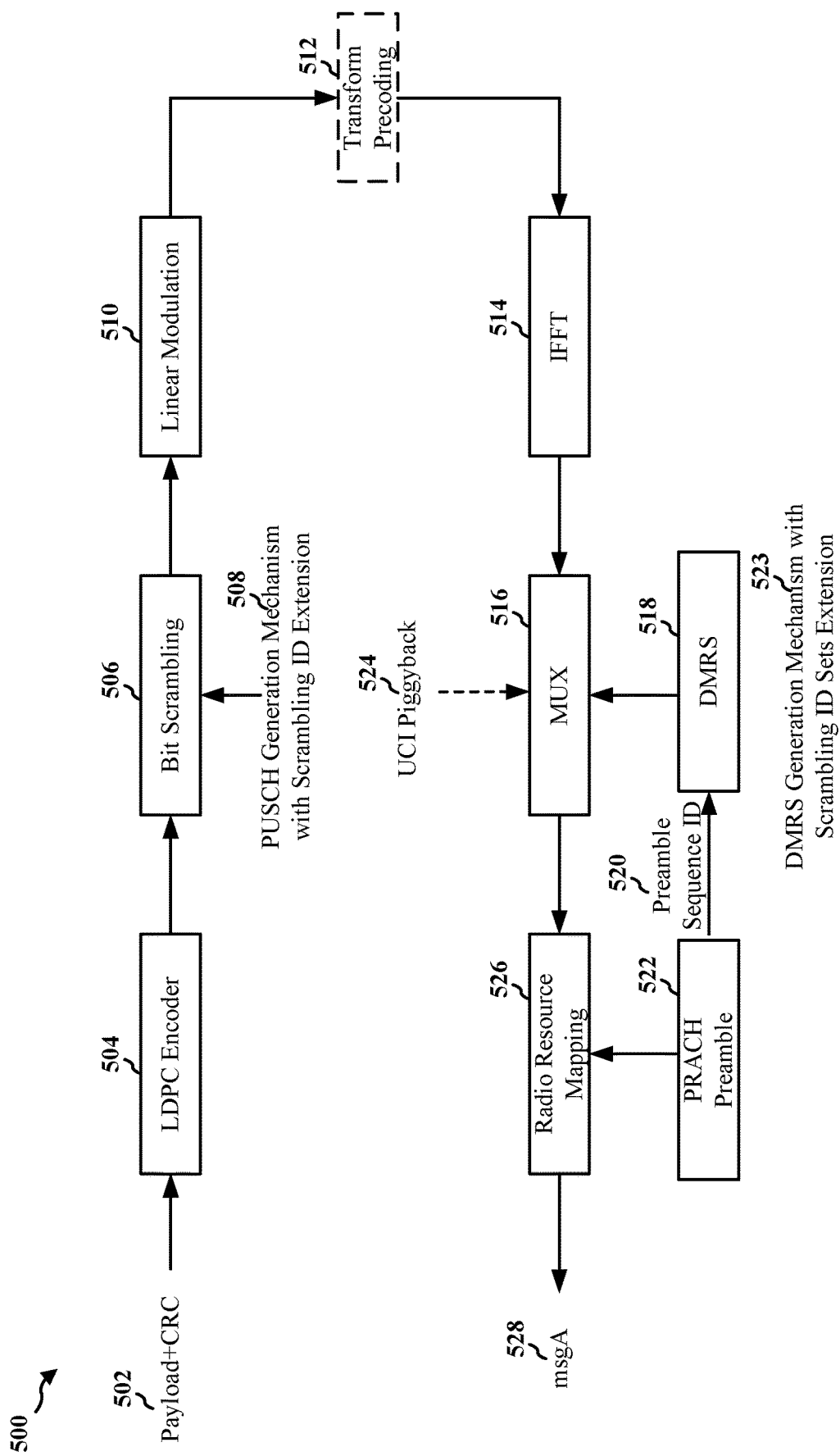
FIG. 5 is a diagram illustrates an example of msgA transmission in two-step RACH.

FIG. 5 illustrates an example diagram 500 of msgA transmission in two-step RACH. Initially, the msgA payload to be transmitted on PUSCH may be combined with a cyclic redundancy check (CRC) at 502. Then, at 504, the payload may be encoded by a low density parity check (LDPC) encoder, which may provide a way to control errors in data transmissions over unreliable or noisy communication channels. Afterwards, the payload may be bit scrambled, at 506, the process of which may be enhanced with a PUSCH scrambling ID extension 508. After the bit scrambling 506, linear modulation 510 and optional transform precoding 512 may be applied to the payload. Subsequently, the payload undergoes an Inverse Fast Fourier Transform (IFFT) 514 and is multiplexed 516 with DMRS 518. The DMRS is generated based on the preamble sequence ID 520 of the UE's selected preamble 522, which may be enhanced with a DMRS scrambling ID sets extension 523. Additionally, uplink control information (UCI) 524 may be piggybacked onto the payload transmission.

The preamble and payload are subsequently mapped to various radio resources at 526 to form msgA 528. The resources for the payload may be physical uplink shared channel (PUSCH) resource units (PRUs), which may include the time-frequency resource configured for transmission of the payload on PUSCH as well as the antenna port and sequence scrambling ID configured for DMRS transmission (i.e. each PRU may be considered a PUSCH occasion with a DMRS resource). As the PUSCH transmission occasion is configured in the frequency and time domains and the DMRS resource is configured in the time, frequency, and code domains, each PRU can be multiplexed in the time, frequency, or code domains into various PRU groups. A mapping rule or an association rule may be applied between the preamble and the PRUs. The mapping rule or association rule may be determined from the random access configuration information. The preamble and the multiplexed payload/DMRS (with or without piggybacked UCI) may be mapped to different PRUs or PRU groups. For example, the association rule may be a one-to-many mapping relationship between a preamble and PRUs. Thus when sending msgA, the UE may transmit the payload and DMRS on multiple PRUs or PRU groups that are mapped to the sequence of a single selected preamble.

Payloads transmitted in msgA (e.g. msgA 409, 528) may have various payload sizes and cell coverage requirements. For example, UP data may have a larger payload size than RRC messages. A different modulation coding scheme (MCS) for different types of payloads may be necessary. To support this variety of payloads, there is a need for msgA transmission in the two-step RACH procedure to allow for configurable MCS and configurable resource sizes in the time-frequency domain. The present disclosure meets this need by providing a one-to-many mapping arrangement between preambles and PRUs, in which the preamble selected by the UE may be mapped to one or more groups of PRUs. This may include piggybacking of UCI, frequency hopping on PUSCH, and/or multiple-slot repetition for msgA transmissions. Piggybacking UCI to a payload in msgA may provide flexibility in the selection of MCS and waveform, as well as provide resource allocation for DMRS and PUSCH in PRUs. Moreover, by allowing a payload to hop to different frequencies on PUSCH during the transmission of msgA, a gain in frequency diversity and interference averaging may be provided. Additionally, by enabling a payload to repeat across multiple slots in msgA transmission, coverage enhancement and/or reliability may be increased.

Figure 6:
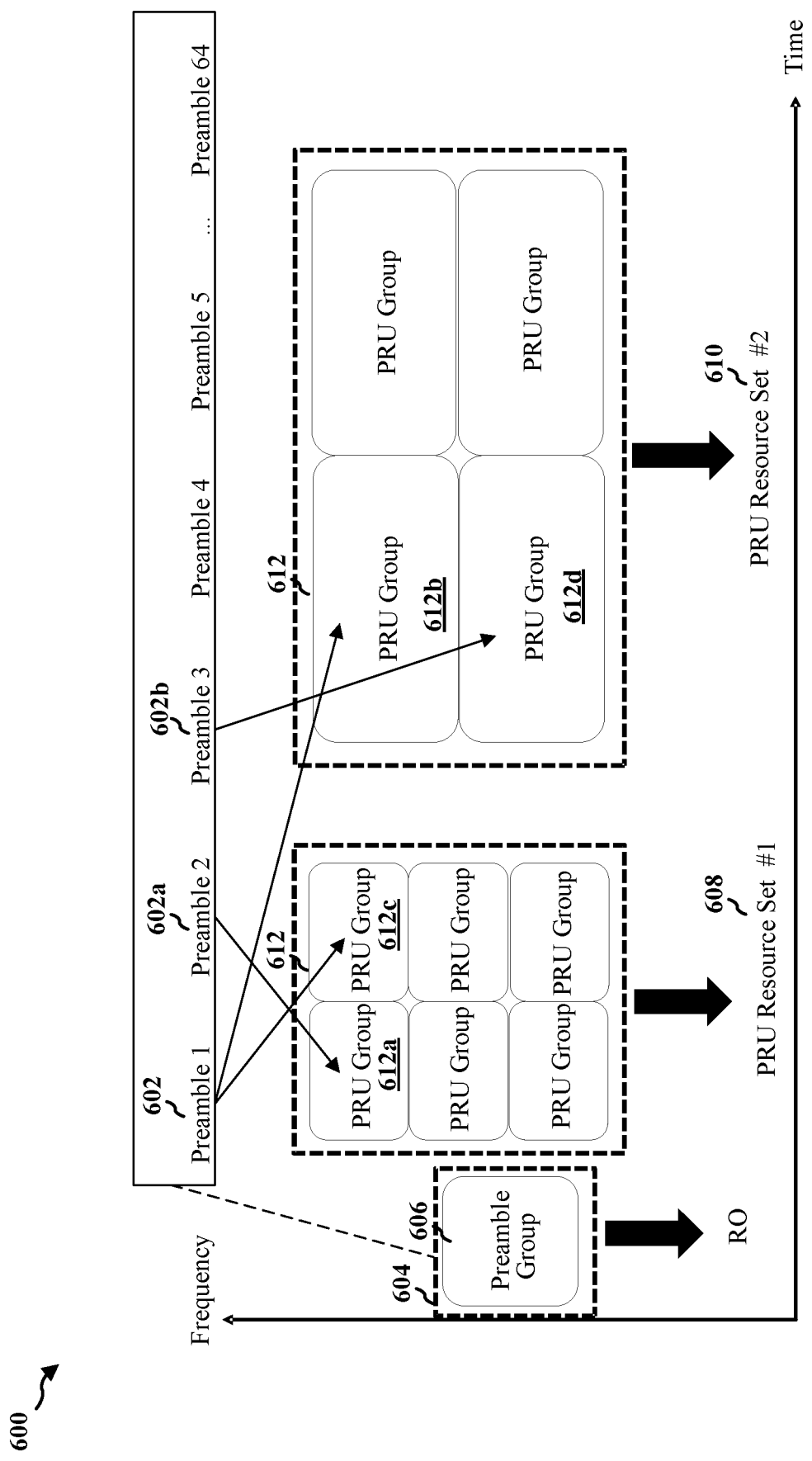
FIG. 6 is a diagram illustrating an example of one-to-many mapping of preambles to PRUs.

FIG. 6 illustrates an example time-frequency diagram 600 of the one-to-many mapping arrangement of preambles to PRUs according to aspects of the present disclosure. In the first message of the two-step RACH process, the UE transmits a preamble 602 to the base station on a random access occasion (RO) 604. The UE determines the preamble from a preamble group 606, which may include multiple preambles 602 having different preamble sequences that can be transmitted on the same RO 604. For example, a preamble group 606 may include 64 preamble sequences, and the UE may determine a preamble 602 from these sequences for transmission on the time and frequency resources associated with the RO 604.

After the UE transmits the preamble 602 of msgA, the UE transmits the payload of msgA. The payload may be transmitted to the base station using PRUs. As noted, different payloads may require different MCS or payload size coverage requirements. For example, as described above, UP data may have a larger payload size than RRC messages, and a smaller modulation coding scheme (MCS) for different payloads may be necessary. Therefore, to simplify payload resource allocation for these different sizes or MCS, the PRUs may be grouped into different PRU resource sets.

For example, FIG. 6 illustrates one preamble group 606 for an RO 604 being associated with a first PRU resource set 608 and a second PRU resource set 610, where each PRU resource set includes one or more groups of PRUs. The PRU groups 612 include PRUs spanning different time/frequency resources in a resource set, and may also differ from each other in a particular resource set, for example, by MCS. The PRU groups 612 may also have similar, time/frequency resource sizes in each resource set, while having different time/frequency resource sizes across resource sets. For instance, FIG. 6 illustrates the first PRU resource set 608 having six PRU groups 612 of identical, smaller resource sizes (corresponding to different time/frequency resources and possibly different MCS), while the second PRU resource set 610 having four PRU groups 612 of identical, larger resource sizes (corresponding to different time/frequency resources and possibly different MCS). This illustration is merely an example. Any number of PRU groups 612 of any resource size may be included in a PRU resource set 608, 610 at different time/frequency resources. Moreover, any number of PRU resource sets 608, 610 may be associated with, or mapped to, a particular preamble group 606.

In one aspect, one preamble group 606 for an RO 604 may be associated with multiple PRU resource sets. More particularly, some preambles in a preamble group can be associated with one PRU resource set, while other preambles in the preamble group can be associated with another PRU resource set. For example, referring to FIG. 6 one preamble 602a in the preamble group 606 may be mapped to PRU group 612a in the first PRU resource set 608, while another preamble 602b in the preamble group 606 may be mapped to PRU group 612d in the second PRU resource set 610. Thus, if the UE determines to transmit a preamble associated with PRU group 612a of the first PRU resource set 608, the UE may subsequently transmit the payload using one or more PRUs in that PRU group 612a. Similarly, if the UE determines to transmit a preamble associated with PRU group 612b of the second PRU resource set 610, the UE may subsequently transmit the payload using one or more PRUs in that PRU group 612d.

The PRU resource sets are orthogonal in the time, frequency, or code domains. For example, FIG. 6 illustrates the first and second PRU resource sets 608, 610 being orthogonal to each other in the time domain 614, although the PRU resource sets can be orthogonal in the frequency domain 616 or code domain as well. For example, the second PRU resource set 610 can be above or below the first resource set 608 on the time-frequency domain diagram 600 of FIG. 6. Moreover, within each PRU resource set, different PRU groups may be orthogonal to each other in the time or frequency domains. For example, FIG. 6 illustrates PRU groups 612a and 612c of the first PRU resource set 608 being orthogonal to each other in the time domain 614, and PRU groups 612b and 612d of the second PRU resource set 610 being orthogonal to each other in the frequency domain 616.

A preamble from the preamble group may be mapped to multiple PRUs in the same PRU resource set. Moreover, a preamble from the preamble group may be mapped to multiple PRUs in different PRU resource sets. For example, referring again to FIG. 6, one preamble in the preamble group 606 may be mapped to PRU groups 612a and 612c of the first PRU resource set 608, to PRU groups 612b and 612d of the second PRU resource set 610, to PRU group 612c of the first PRU resource set 608 and PRU group 612d of the second PRU resource set 610, or to any combination of PRU groups 612 and PRU resource sets 608, 610. For instance, FIG. 6 illustrates preamble 1 602 being mapped to PRU group 612c in the first resource set and PRU group 612b of the second PRU resource set.

Figure 7:
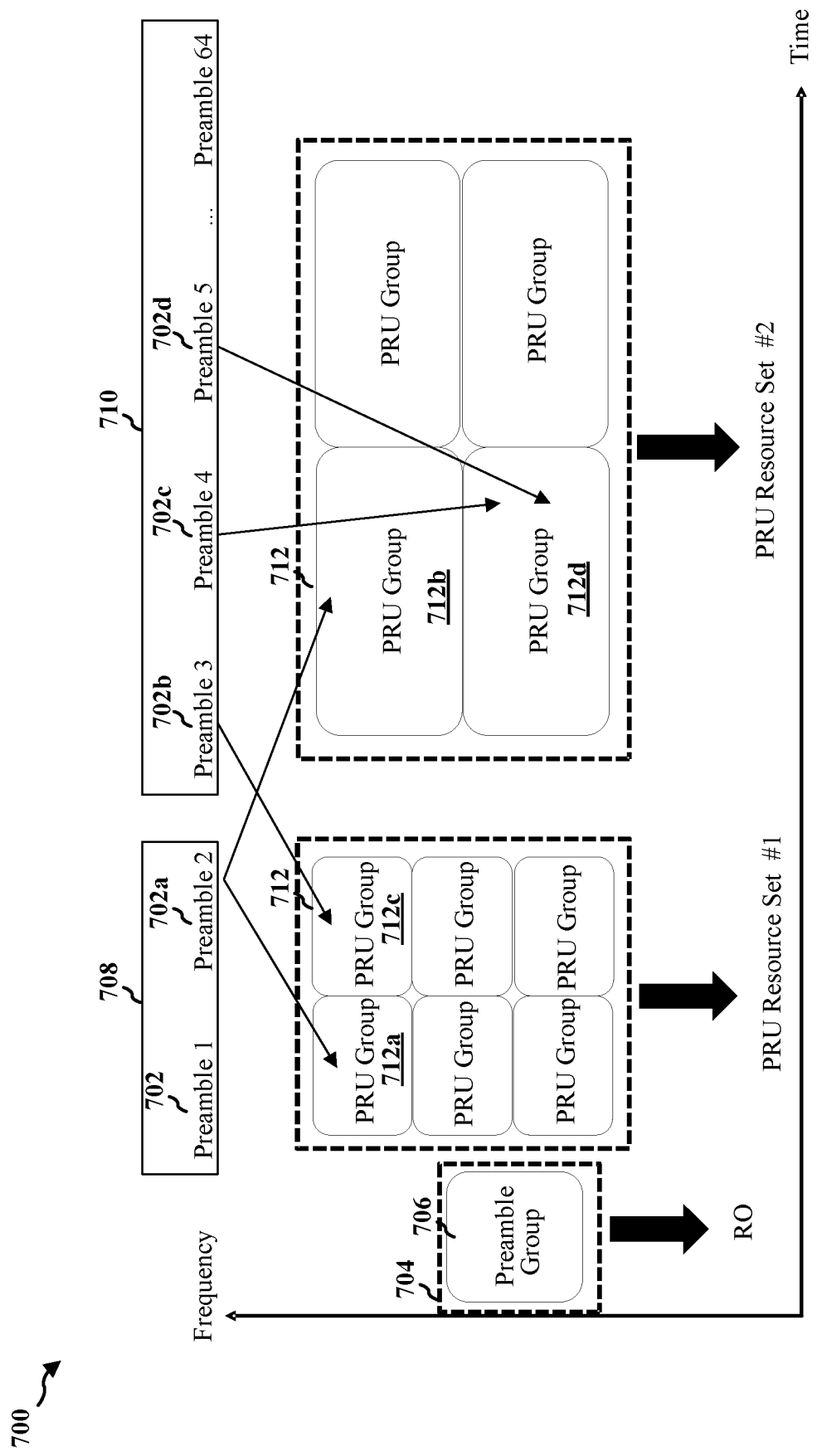
FIG. 7 is a diagram illustrating another example of one-to-many mapping of preambles to PRUs.

While one-to-many mapping arrangements are thus provided between a preamble and multiple PRU groups, other preambles in the preamble group configured for the RO may not support one-to-many mapping. Instead, these preambles may only support one-to-one mapping (e.g. one preamble being associated with one PRU group), or many-to-one mapping (e.g. multiple preambles being associated with the same PRU group). The present disclosure allows for such mapping. For example, FIG. 7 illustrates a time frequency diagram 700 in which the UE transmits a preamble 702 to the base station on a RO 704. The preamble is determined from a preamble group 706 configured for the RO 704 including a first set of preambles 708 and a second set of preambles 710, where each preamble in the first set of preambles 708 supports a one-to-many mapping arrangement, and each preamble in the second set of preambles 710 supports either a one-to-one mapping arrangement or many-to-one mapping arrangement. Thus, if one preamble group 706 configured for an RO includes 64 preambles of different preamble sequences, the first set of preambles 708 (e.g. three or another number) may individually be associated with multiple PRU groups 712 in the same or different PRU resource sets as described above, while the other set of preambles 710 (e.g. the remainder) may individually or in a plurality be associated with only one PRU group 712 in a PRU resource set. For instance, in one example shown in FIG. 7, preamble 2 702a may be associated with PRU group 712a and PRU group 712b (one-to-many mapping), while preamble 3 702b may be associated with PRU group 712c (one-to-one mapping) and preambles 4 702c and 5 702d may be associated with PRU group 712d (many-to-one mapping). Other preamble to PRU mapping combinations are possible.

Figure 8:
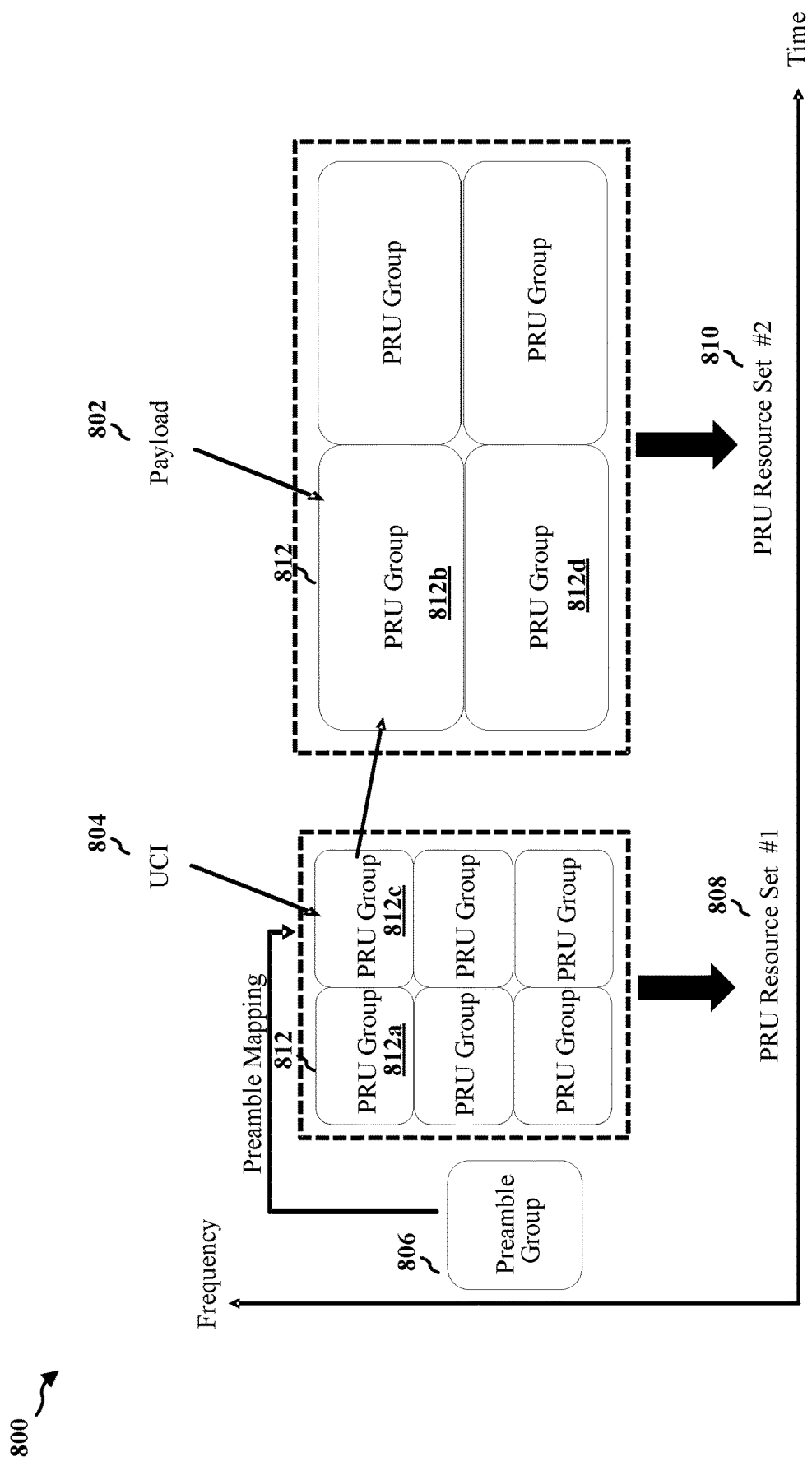
FIG. 8 is a diagram illustrating an example of one-to-many mapping of a preamble to PRUs in order to support UCI piggybacking on the payload.

The first random access message may include UCI in addition to the preamble and the payload. Referring to FIG. 8, in one aspect, a UCI and payload in msgA may be mapped to different PRU groups based on the above-described one-to-many mapping arrangement in order to support UCI piggybacking on the payload. For example, FIG. 8 shows an example time-frequency diagram 800 in which the msgA includes the payload 802 and a UCI 804 including information for configuring the payload. In one aspect, the UCI 804 may indicate the MCS, transport block size (TBS), waveform, and resource allocation information of the payload 802. In another aspect, the UCI 804 may further indicate a frequency hopping pattern and/or multiple-slot repetition information for the payload 802, as described infra.

In this example, the UE first determines a preamble from the preamble group 806, which is associated with a PRU group 812 (e.g. PRU group 812a, 812c) in the first PRU resource set 808 as described above with respect to FIG. 6. For example, the preamble may be mapped to PRU group 812c in the first PRU resource set 808. This PRU group 812c carries the UCI 804 providing configuration information for the payload 802 of msgA, including resource allocation information for another PRU group 812 (e.g. PRU group 812b, 812d) in another PRU resource set 810. For instance, the UCI 804 in PRU group 812c of the first PRU resource set 808 may allocate PRU group 812b of the second PRU resource set 810 to carry the payload 802. The UE may subsequently transmit the payload 802 (e.g. on PUSCH) using the allocated PRU group 812b of the second PRU resource set 810 linked from the UCI 804.

As a result, the UE may piggyback UCI 804 to a payload in msgA based on the one-to-many mapping arrangement between the UE's determined preamble and the multiple PRU groups 812. By using different PRU resource sets 808, 810, the first PRU group 812c carrying the UCI may have a different resource size and/or MCS than the second PRU group 812b carrying the payload. Moreover, different PRU groups 812 and/or resource sets 808, 810 may be used for the UCI 804 and payload 802 depending on the preamble the UE selects from the preamble group 806 on one RO. Thus, the present disclosure may provide flexibility in the selection of MCS and waveform, as well as provide resource allocation for DMRS and PUSCH in PRUs, when transmitting a payload in msgA to the base station with piggybacked UCI.

Figure 9:
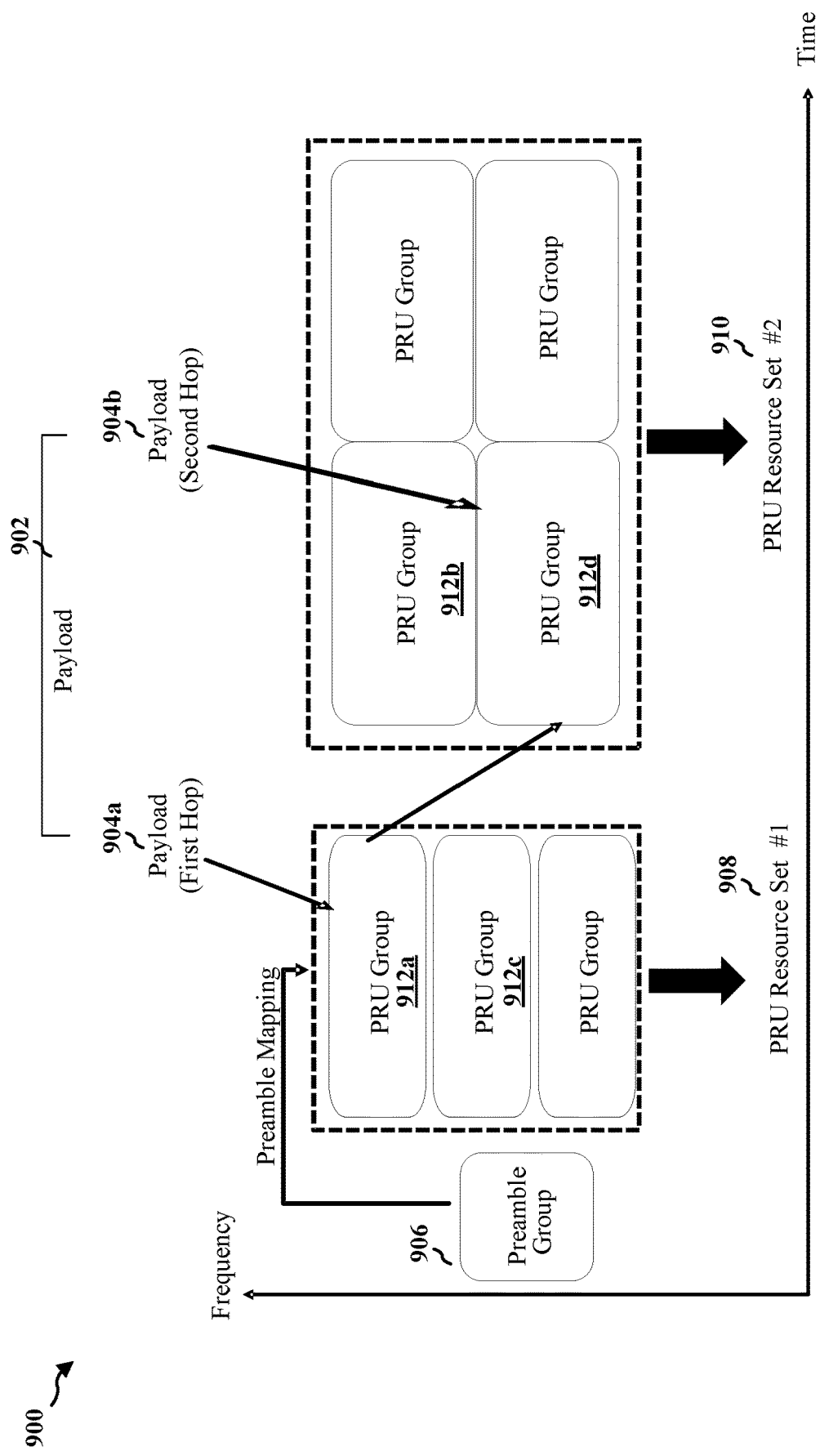
FIG. 9 is a diagram illustrating an example of one-to-many mapping of a preamble to PRUs in order to support frequency hopping for the payload transmission.

Referring to FIG. 9, in one aspect, the payload in msgA may be mapped to different PRU groups based on the above-described one-to-many mapping arrangement of FIG. 6 in order to support frequency hopping for the payload transmission. For example, FIG. 9 shows an example time-frequency diagram 900 in which the msgA includes the payload 902 transmitted according to a hopping pattern on multiple PRU resource sets 908, 910. In this example, msgA does not include a piggybacked UCI for configuring the payload, although a piggybacked UCI may be included (see FIG. 11). The hopping pattern may be intra-slot (e.g. the msgA PUSCH configuration is a Type-B PUSCH mapping, where the msgA payload transmission may hop frequencies after a certain number of symbols in a slot of a physical resource block (PRB), and where each hop occupies a pre-configured PRU), or inter-slot (e.g. the msgA PUSCH configuration is a Type-A PUSCH mapping, where the msgA payload transmission may hop frequencies after a certain number of slots of one or more PRBs, and where each hop occupies a pre-configured PRU). The msgA PUSCH configuration (e.g. PUSCH mapping type A or B) may be one or more RRC parameters in random access configuration information. Moreover, the msgA PUSCH configuration (type A or type B) for idle or inactive UEs may be included in a time domain resource allocation (TDRA) table.

The UE first determines a preamble from the preamble group 906, which is associated with a PRU group (e.g. PRU group 912a, 912c) in the first PRU resource set 908 as described above. For example, the preamble may be mapped to PRU group 912a in the first PRU resource set 908 for carrying the payload 904a of msgA at a first frequency. Thus, each PRU in the PRU group 912a may carry the payload 904a of msgA at the first frequency for a predetermined duration of time, for instance, the length in time of PRU group 912a. Moreover, based on either a dynamic or static frequency offset, the PRU group 912a in the first PRU resource set 908 may be mapped to another PRU group (e.g. PRU group 912b or 912d) in the second PRU resource set 910 for carrying the payload 904b of msgA at a second frequency. For example, the second frequency may be dynamically determined as a function of the first frequency, an index of the first PRU group 912a, an index of the first resource set 908, channel information in the first PRU group or first resource set, or other information. The second frequency may also be based on a frequency hopping pattern obtained by the UE (e.g. in random access configuration information received from the base station, or in UCI as described infra). Alternatively, the second frequency may be statically determined to be at a fixed offset (e.g. 200 MHz or other frequency) from the first frequency. Thus, each PRU in the PRU group 912d may carry the payload 904b of msgA at the second frequency for another predetermined duration of time, for instance, the length in time of PRU group 912d. The process may repeat for subsequent frequencies until the payload 902 is fully transmitted; for example, after the UE hops from the first PRU group 912a in the first PRU resource set 908 to the second PRU group 912d in the second PRU resource set 910 to carry the payload 902 as described above, the UE may hop to a third PRU group in the second PRU resource set 910 (or to another PRU group in another PRU resource set) to transmit the payload 902 based on the dynamically or statically determined frequency offset or frequency hopping pattern.

The preamble for the msgA PUSCH in two-step RACH may thus be mapped to multiple PRUs for intra-slot frequency hopping (as well as inter-slot frequency hopping). For example, for a msgA PUSCH, a frequency offset may be provided by a higher layer parameter. In case of intra-slot frequency hopping, the starting RB in each hop may be given by:

$$RB_{start} = \begin{cases} RB_{start} & i = 0 \\ (RB_{start} + RB_{offset}) \bmod N_{BWP}^{size} & i = 1 \end{cases}.$$

where i=0 and i=1 are the first hop and the second hop respectively, and $RB_{start}$ is the starting resource block (RB) within the uplink (UL) bandwidth part (BWP), as calculated from resource block assignment information of resource allocation type 1, and $RB_{offset}$ is the frequency offset in RBs between the two frequency hops. The number of symbols in the first hop may be given by $\lfloor N_{symb}^{PUSCH,s}/2 \rfloor$, and the number of symbols in the second hop may be given by $N_{symb}^{PUSCH,s} - \lfloor N_{symb}^{PUSCH,s}/2 \rfloor$, where $N_{symb}^{PUSCH,s}$ is the length of the PUSCH transmission in OFDM symbols in one slot. A PUSCH transmission with frequency hopping in a slot may be indicated by a parameter, e.g. msgA-intraSlotFrequencyHopping, for the active UL BWP. In some cases, a first symbol of the PUSCH transmission after frequency hopping may be separated by a number of symbols from a last symbol of the PUSCH transmission before frequency hopping; in other cases, there may be no time separation of the PUSCH transmission before and after frequency hopping.

As a result, the UE may transmit a payload 902 according to a hopping pattern in msgA based on the one-to-many mapping arrangement between the UE's determined preamble and the multiple PRU groups. By using different PRU groups and/or PRU resource sets 908, 910, the first PRU group 912a carrying the payload 904a may have a different frequency than the second PRU group 912d carrying the payload 904b. Moreover, different PRU groups and/or resource sets 908, 910 may be used for the payload 902 depending on the preamble the UE selects from the preamble group 906 on one RO. Thus, the present disclosure allows a payload 902 to be transmitted in msgA to the base station based on a hopping pattern of different frequencies on PUSCH, thereby providing a gain in frequency diversity and interference averaging.

Figure 10:
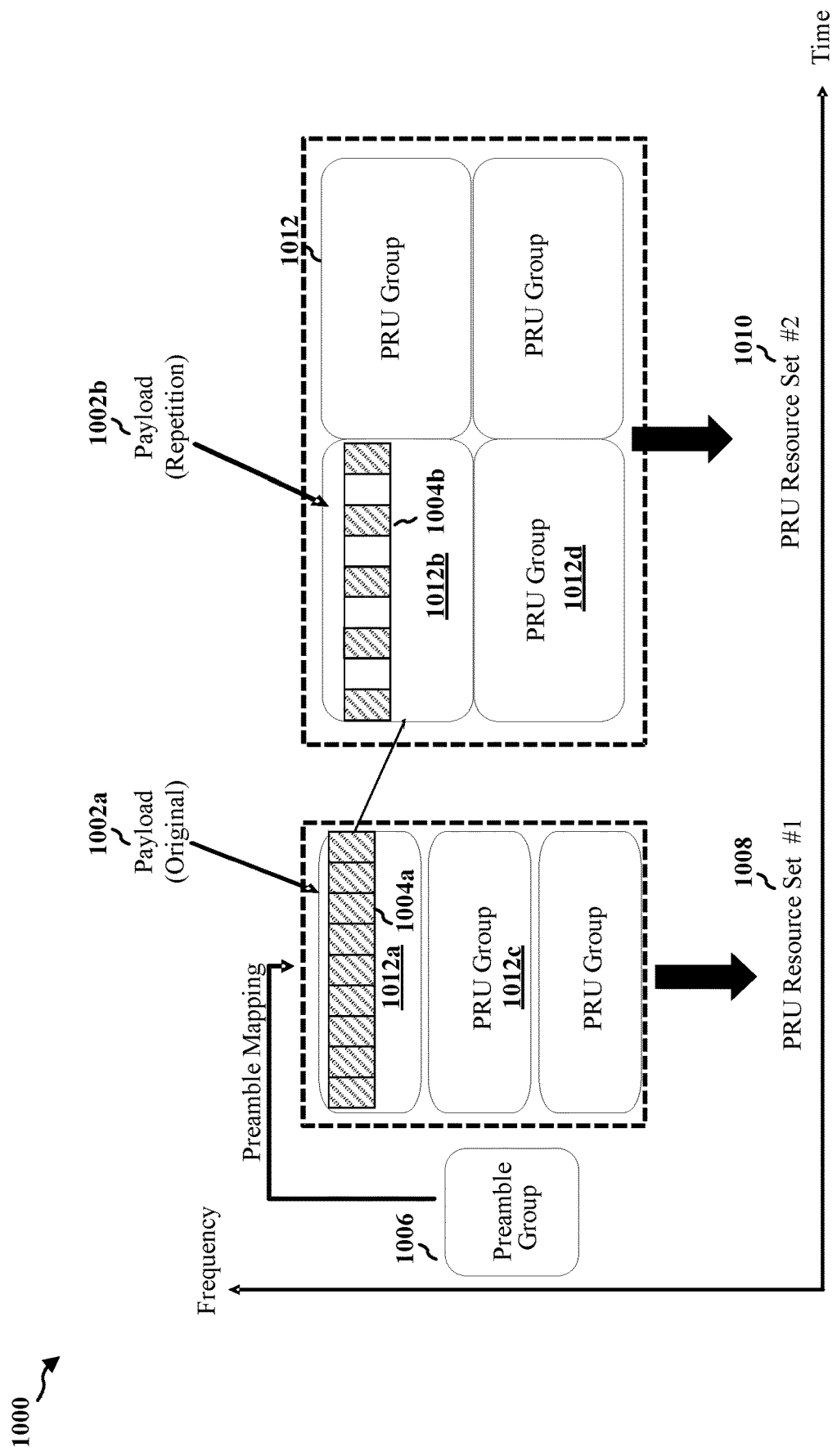
FIG. 10 is a diagram illustrating an example of one-to-many mapping of a preamble to PRUs in order to support multiple-slot repetition for the payload transmission.

Referring to FIG. 10, in one aspect, the payload in msgA may be mapped to different PRU groups based on the above-described one-to-many mapping arrangement of FIG. 6 in order to support multiple-slot repetition for the payload transmission. For example, FIG. 10 shows an example time-frequency diagram 1000 in which the msgA includes the payload 1002a transmitted in multiple slots 1004a, 1004b on multiple PRU resource sets 1008, 1010. In this example, msgA does not include a piggybacked UCI for configuring the payload, although a piggybacked UCI may be included (see FIG. 11). The multiple-slot repetition may be inter-slot (e.g. the msgA PUSCH configuration is a Type-A PUSCH mapping, where each repetition of the msgA payload transmission occupies a pre-configured PRU). For instance, the multiple-slot repetition of the payload 1002a, 1002b may span consecutive slots of one or more PRBs in the time-domain (as shown, for example, in PRU group 1012a but possible for any PRU group) or non-consecutive slots of one or more PRBs in the time-domain (as shown, for example, in PRU group 1012b but possible for any PRU group). The multiple-slot repetition may alternatively be intra-slot (e.g. the msgA PUSCH configuration is a Type-B PUSCH mapping, where each repetition of the msgA payload transmission occupies a pre-configured PRU in a mini-slot of the PUSCH). The msgA PUSCH configuration (e.g. PUSCH mapping type A or B) may be one or more RRC parameters in random access configuration information. Moreover, the msgA PUSCH configuration (type A or type B) for idle or inactive UEs may be included in a time domain resource allocation (TDRA) table.

The UE first determines a preamble from the preamble group 1006, which is associated with a PRU group 1012 (e.g. PRU group 1012a, 1012c) in the first PRU resource set 1008 as described above. For example, the preamble may be mapped to PRU group 1012a in the first PRU resource set 1008 for carrying the payload 1002a of msgA in a first set of slots 1004a. Thus, each PRU in the PRU group 1012a may carry the payload 1002a of msgA in the first set of slots 1004a for a predetermined duration of time, e.g. a number of consecutive (or non-consecutive) slots in the first set of slots 1004a. Moreover, based on a dynamic or static determination of this number of slots, the PRU group 1012a in the first PRU resource set 1008 may be mapped to another PRU group (e.g. PRU group 1012b or 1012d) in the second PRU resource set 1010 for repeating the payload 1002b of msgA in a second set of slots 1004b. For example, the second set of slots 1004b may be dynamically determined as a function of the number of slots in the first set of slots 1004a, an index of the first PRU group 1012a, an index of first resource set 1008, channel information in the first PRU group 1012a or first resource set 1008, or other information. The second set of slots 1004b may also be determined based on slot-repetition information obtained by the UE (e.g. in random access configuration information received from the base station, or in UCI as described infra). Alternatively, the second set of slots 1004b may be statically determined to be at a fixed offset (e.g. 1 ms or other time duration) from the first set of slots 1004a. Thus, each PRU in the PRU group 1012b may repeat the payload 1002b of msgA in the second set of slots 1004b for another predetermined duration of time, for instance, a number of non-consecutive (or consecutive) slots in the second set of slots 1004b. The process may repeat for subsequent sets of consecutive or non-consecutive slots in additional PRU groups 1012 or PRU resource sets 1008, 1010.

As a result, the UE may transmit and repeat a payload 1002a, 1002b in msgA using multiple-slot repetition based on the one-to-many mapping arrangement between the UE's determined preamble and the multiple PRU groups 1012. By using different PRU groups 1012 and/or PRU resource sets 1008, 1010, the second PRU group 1012b repeating the payload 1002b may provide better coverage enhancement or reliability than the first PRU group 1012a originally transmitting the payload 1002a. Moreover, different PRU groups 1012 and/or resource sets 1008, 1010 may be used for the payload depending on the preamble the UE selects from the preamble group 1006 on one RO. Thus, the present disclosure allows a payload 1002a, 1002b to be transmitted and repeated in msgA to the base station based on multiple-slot repetition on PUSCH, thereby providing coverage enhancement and reliability of transmissions.

Figure 11:
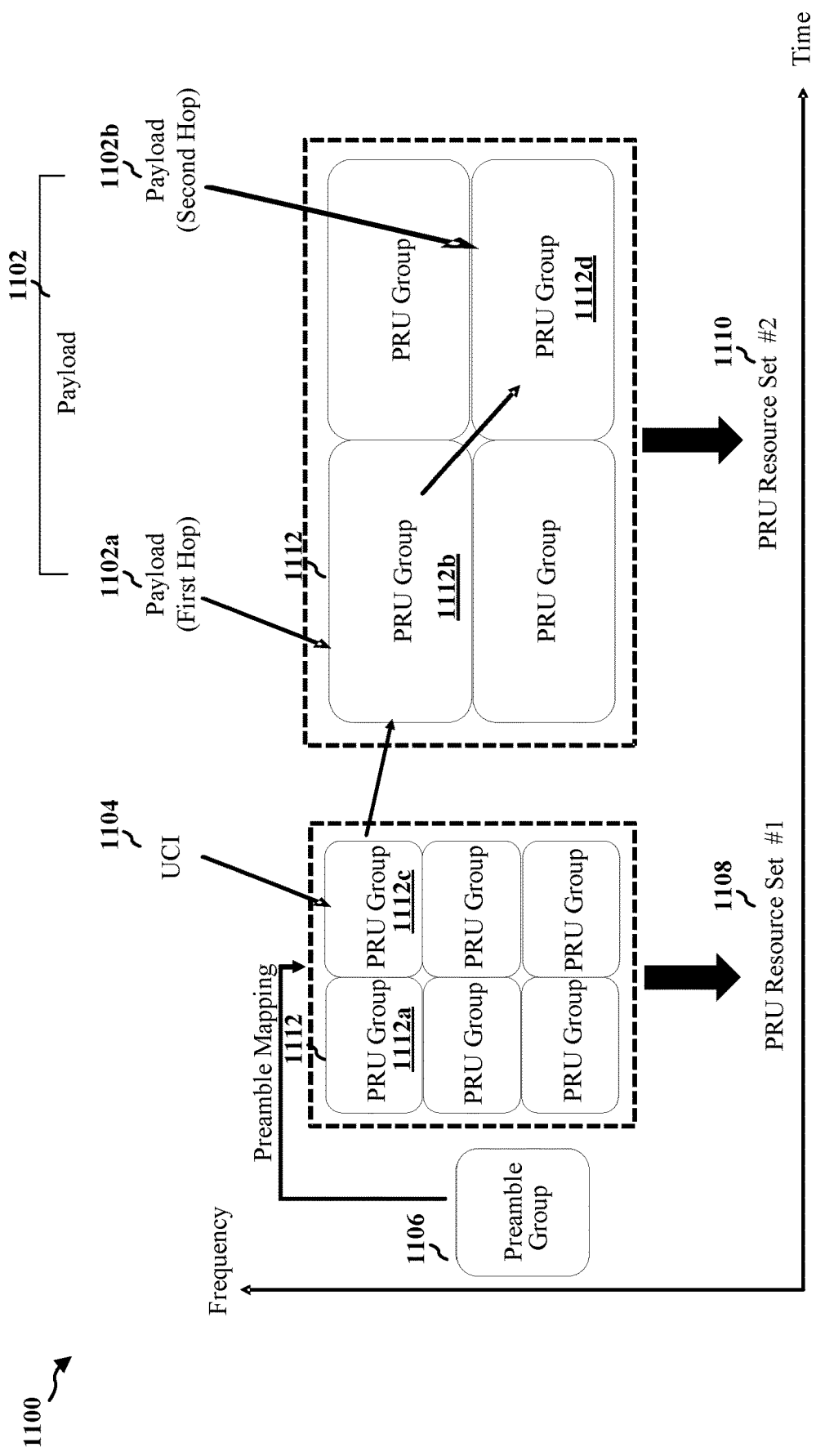
FIG. 11 is a diagram illustrating an example of one-to-many mapping of a preamble to PRUs in order to support a combination of UCI piggybacking on the payload and frequency hopping and/or multiple-slot repetition for the payload transmission.

Referring to FIG. 11, in one aspect, a UCI and payload in msgA may be mapped to different PRU groups based on the above-described one-to-many mapping arrangement in order to support a combination of UCI piggybacking on the payload and frequency hopping and/or multiple-slot repetition for the payload transmission. For example, FIG. 11 shows an example time-frequency diagram 1100 in which the msgA includes a UCI 1104 including information for configuring the payload 1102 (as described above in FIG. 8), and in which the msgA includes the payload 1102 transmitted according to a hopping pattern on multiple PRU resource sets 1108, 1110 (as described above in FIG. 9). The payload 1102 may additionally or alternatively be transmitted in multiple slots on multiple PRU resource sets (as described above in FIG. 10). In one aspect, the UCI 1104 may indicate the MCS, transport block size (TBS), waveform, resource allocation information of the payload, as well as a frequency hopping pattern and/or multiple-slot repetition information for the payload. The hopping pattern may be intra-slot (e.g. the payload transmission may hop frequencies after a certain number of symbols in a slot of a physical resource block (PRB)), or inter-slot (e.g. the payload transmission may hop frequencies after a certain number of slots of one or more PRBs). Moreover, the multiple-slot repetition of the payload 1102 may span consecutive slots or non-consecutive slots of one or more PRBs in the time-domain.

In this example, the UE first determines a preamble from the preamble group 1106, which is associated with a PRU group 1112 (e.g. PRU group 1112a, 1112c) in the first PRU resource set 1108 as described above with respect to FIG. 6. For example, the preamble may be mapped to a first PRU group 1112c in the first PRU resource set. This PRU group 1112c carries the UCI 1104 providing configuration information for the payload 1102 of msgA, including resource allocation information for another PRU group (e.g. PRU group 1112b, 1112d) in another PRU resource set. For instance, the UCI in first PRU group 1112c of the first PRU resource set 1108 may allocate second PRU group 1112b of the second PRU resource set 1110 to carry the payload 1102. The UE may subsequently transmit the payload 1102 (e.g. on PUSCH) using the second PRU group 1112b of the second PRU resource set 1110 linked from the UCI 1104.

Each PRU in the second PRU group 1112b may carry or repeat the payload 1102a of msgA at a first frequency or in a first set of slots for a predetermined duration of time, for instance, the length in time of PRU group 1112b. Moreover, based on frequency hopping information in the UCI 1104, or a dynamically or statically determined frequency offset or number of slots, the second PRU group 1112b in the second PRU resource set 1110 may be mapped to a third PRU group 1112d in the second PRU resource set 1110 for carrying or repeating the payload 1102b of msgA at a second frequency or second set of slots. For example, the second frequency or second set of slots may be respectively based on a frequency hopping pattern or slot repetition information determined by the UE and configured in UCI 1104. Alternatively, the second frequency or second set of slots may be dynamically determined as a function of the first frequency or first set of slots, an index of the second PRU group 1112b, an index of the second resource set 1110, channel information in the second PRU group 1112b or second resource set 1110, or other information. Alternatively, the second frequency or second set of slots may be statically determined to be at a fixed offset (e.g. 200 MHz or other frequency or 1 ms or other time duration) from the first frequency or first set of slots. Thus, each PRU in the third PRU group 1112d may carry or repeat the payload 1102b of msgA at the second frequency or the second set of slots for another predetermined duration of time, for instance, the length in time of PRU group 1112d. The process may repeat for subsequent frequencies until the payload 1102 is fully transmitted, and similarly may repeat for subsequent sets of consecutive or non-consecutive slots in additional PRU groups 1112 or PRU resource sets 1108, 1110.

As a result, in msgA, the UE may include UCI 1104 with a payload 1102, may transmit a payload 1102a, 1102b according to a hopping pattern, and may transmit and repeat a payload using multiple-slot repetition based on the one-to-many mapping arrangement between the UE's determined preamble and the multiple PRU groups 1112. By using different PRU resource sets 1108, 1110, the first PRU group 1112c carrying the UCI 1104 may have a different resource size and/or MCS than the second PRU group 1112b carrying the payload 1102a, the second PRU group 1112b carrying the payload 1102a may have a different frequency than the third PRU group 1112d carrying the payload 1102b. If repeating the payload 1102, the third PRU group 1112d may also provide better coverage enhancement or reliability than the second PRU group 1112b originally transmitting the payload. Moreover, different PRU groups 1112 and/or resource sets 1108, 1110 may be used for the UCI 1104 and payload 1102 depending on the preamble the UE selects from the preamble group 1106 on one RO. Thus, the present disclosure may provide flexibility in the selection of MCS and waveform, as well as provide resource allocation for DMRS and PUSCH in PRUs, when transmitting a payload 1102 in msgA to the base station with piggybacked UCI. The present disclosure also allows a payload 1102 to be transmitted in msgA to the base station based on a hopping pattern of different frequencies on PUSCH, thereby providing a gain in frequency diversity and interference averaging. Furthermore, the present disclosure allows a payload 1102 to be transmitted and repeated in msgA to the base station based on multiple-slot repetition on PUSCH, thereby providing coverage enhancement and reliability of transmissions.

Figure 12:
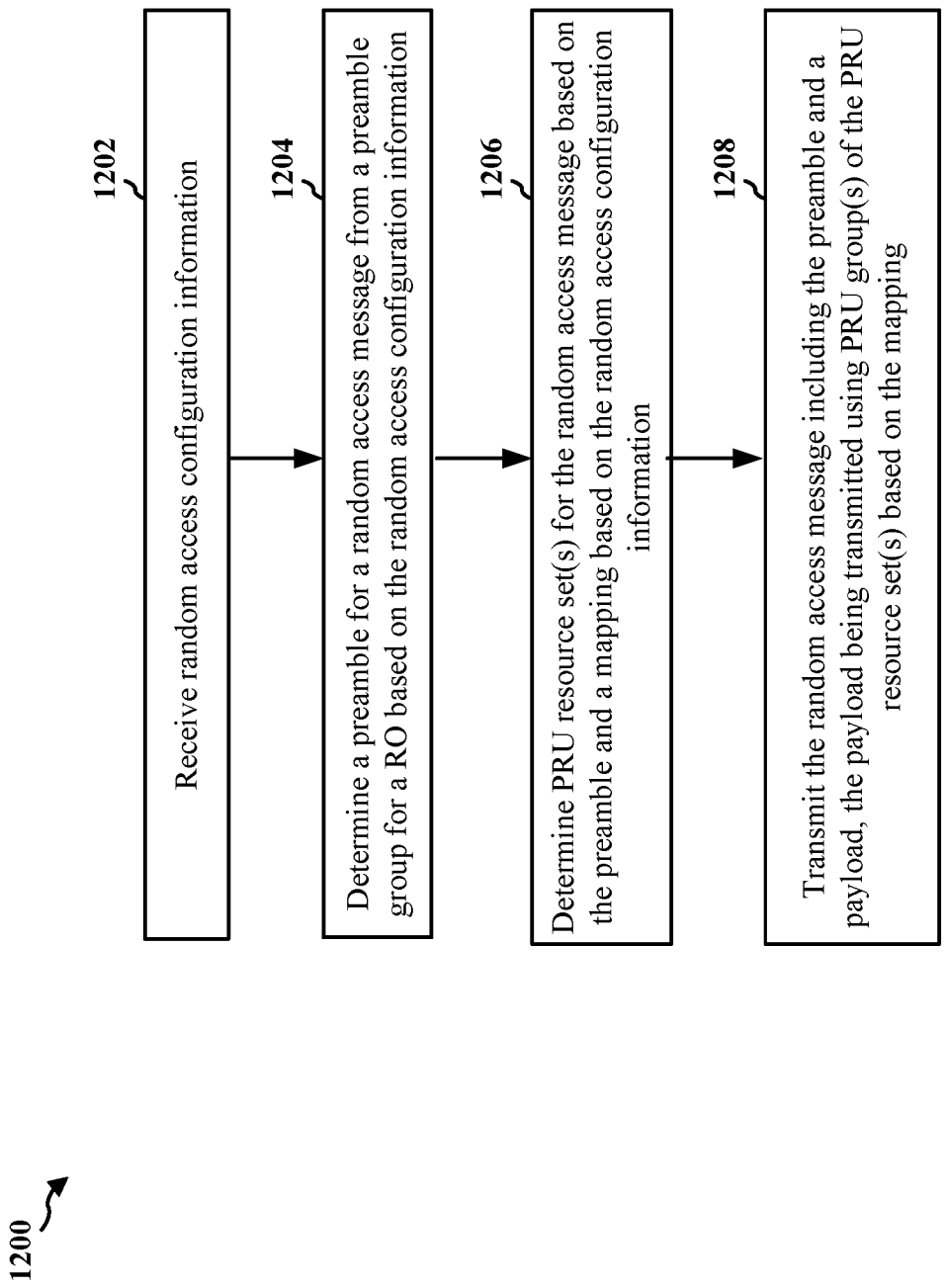
FIG. 12 is a flowchart of a method of wireless communication at a UE.

FIG. 12 is a flowchart 1200 of a method of wireless communication. The method may be performed by a UE (e.g., the UE 104, 350, 402; the apparatus 1302/1302'; the processing system 1414, which may include the memory 360 and which may be the entire UE 350 or a component of the UE 350, such as the TX processor 368, the RX processor 356, and/or the controller/processor 359). The method allows a UE to send msgA transmissions in a two-step RACH process using a one-to-many mapping arrangement between preambles and PRUs, in which the preamble selected by the UE may be mapped to one or more PRU groups to support UCI piggybacking, PUSCH hopping, and/or multiple-slot repetition.

At 1202, the UE receives, from a base station, random access configuration information. For example, 1202 may be performed by random access configuration component 1306 in FIG. 13. For instance, referring to FIG. 4, prior to the beginning of a two-step RACH process, the UE may receive random access configuration information 406 from the base station. For example, the UE may receive an SSB, a SIB, and/or a reference signal broadcast by the base station. The UE may process these signals and channels and determine the configuration for the two-step RACH.

At 1204, the UE determines a preamble for a random access message from a preamble group for a RO. For example, 1204 may be performed by preamble component 1308 in FIG. 13. For instance, referring to FIG. 6, the UE may determine a preamble from a preamble group 606, which may include multiple preambles 602 having different preamble sequences that can be transmitted on the same RO 604. In one example, a preamble group 606 may include 64 preamble sequences, and the UE may determine a preamble 602 from these sequences for transmission on the time and frequency resources associated with the RO 604.

The UE determines a mapping based on the random access configuration information. For example, 1206 may be performed by mapping component 1310 in FIG. 13. The mapping may comprise one-to-many mapping (e.g. one preamble is associated with multiple PRU groups), one-to-one mapping (e.g. one preamble is associated with one PRU group), or many-to-one mapping (e.g. multiple preambles are associated with the same PRU group). For instance, referring to FIG. 7, the UE may determine from the random access configuration that a preamble in preamble group 706 supports a one-to-many mapping arrangement, a one-to-one mapping arrangement or many-to-one mapping arrangement. More particularly, the UE may determine based on the random access configuration that some preambles may individually be associated with multiple PRU groups in the same or different PRU resource sets, while other preambles may individually or in a plurality be associated with only one PRU group. Thus, in one example, if one preamble group 706 configured for an RO includes 64 preambles of different preamble sequences, the UE may determine that preamble 2 702a is associated with PRU group 712a and PRU group 712b (one-to-many mapping), preamble 3 702b is associated with PRU group 712c (one-to-one mapping) and preambles 4 702c and 5 702d are associated with PRU group 712d (many-to-one mapping).

Each PRU group may comprise a time-frequency resource associated with a PUSCH transmission and an antenna port and sequence scrambling identification associated with a DMRS transmission. For example, referring to FIG. 5, the preamble and payload may be mapped to various radio resources (e.g. PRUs) at 526 to form msgA 528, where each PRU includes the time-frequency resource configured for transmission of the payload on PUSCH as well as the antenna port and sequence scrambling ID configured for DMRS transmission. Each PRU can be multiplexed in the time, frequency, or code domains into various PRU groups, and based on the association rule between the preamble and PRUs determined from the random access configuration information, the preamble and the multiplexed payload/DMRS may be mapped to different PRUs or PRU groups.

At 1206, the UE determines one or more PRU resource sets for the random access message based on the preamble, where the random access configuration information maps the preamble to the one or more PRU resource sets. For example, 1208 may be performed by PRU resource set component 1312 in FIG. 13. The one or more PRU resource sets may comprise a first PRU resource set and a second PRU resource set. For instance, referring to FIG. 6, the UE may determine a first PRU resource set 608 and a second PRU resource set 610 in association with the preamble group 606 for an RO 604 from which preamble 602 is determined, where each PRU resource set includes one or more groups of PRUs (PRU groups 612). Based on the mapping obtained from the random access configuration information (for example, a one-to-many mapping arrangement), the UE may determine which PRU resource sets 608 and/or 610 include one or more PRU groups 612 mapped to the selected preamble 602.

In one aspect, the one or more PRU resource sets comprise a plurality of PRU resource sets associated with the preamble group configured for the RO, and the plurality of resource sets are orthogonal in at least one of a time domain, a frequency domain or a code domain. For instance, referring to FIG. 6, one preamble group 606 for an RO 604 may be associated with multiple PRU resource sets. More particularly, some preambles in a preamble group can be associated with one PRU resource set, while other preambles in the preamble group can be associated with another PRU resource set. The PRU resource sets may also be orthogonal in the time, frequency, and/or code domains. For example, FIG. 6 illustrates the first and second PRU resource sets 608, 610 being orthogonal to each other in the time domain 614, although the PRU resource sets can be orthogonal in the frequency domain 616 or code domain as well.

In another aspect, the one or more PRU resource sets comprise a plurality of PRUs associated with the preamble group configured for the RO, and wherein the preamble determined by the UE is associated with multiple PRU groups in a single PRU resource set. For instance, referring to FIG. 6, one preamble group 606 for an RO 604 may be associated with multiple PRU resource sets. The preamble, determined from the preamble group, may be mapped to multiple PRUs in the same PRU resource set. For example, one preamble 602a in the preamble group 606 may be mapped to PRU groups 612a and 612c of the first PRU resource set 608, or to PRU groups 612b and 612d of the second PRU resource set 610.

In a further aspect, the one or more PRU resource sets may comprise a plurality of PRUs associated with the preamble group configured for the RO, and the preamble determined by the UE is associated with at least one PRU group in different PRU resource sets. For instance, referring to FIG. 6, one preamble group 606 for an RO 604 may be associated with multiple PRU resource sets, and the preamble determined from the preamble group may be mapped to multiple PRUs in different PRU resource sets. For example, one preamble 602a in the preamble group 606 may be mapped to PRU group 612c of the first PRU resource set 608 and PRU group 612d of the second PRU resource set 610, or to any combination of PRU groups 612 and PRU resource sets 608, 610.

In other aspects, the preamble group may comprise a first set of preambles and a second set of preambles, where each preamble of the first set of preambles is associated with multiple PRU groups in one or more of the plurality of PRU resource sets, and at least one preamble of the second set of preambles is associated with a single PRU group in one of the plurality of PRU resource sets. For example, referring to FIG. 7, the preamble may be determined from a preamble group 706 configured for the RO 704 including a first set of preambles 708 and a second set of preambles 710, where each preamble in the first set of preambles 708 supports a one-to-many mapping arrangement, and each preamble in the second set of preambles 710 supports either a one-to-one mapping arrangement or many-to-one mapping arrangement. For instance, in one example shown in FIG. 7, preamble 2 702a may be in the first set of preambles and may be associated with PRU group 712a and PRU group 712b (one-to-many mapping), while preamble 3 702b may be in the second set of preambles and is associated with PRU group 712c (one-to-one mapping). Similarly, preamble 4 702c and preamble 5 702d may be in the second set of preambles and are associated with PRU group 712d (many-to-one mapping). Other preamble to PRU mapping combinations are possible.

According to an aspect of the present disclosure relating to UCI piggybacking, the random access message may comprise UCI transmitted using a first PRU group in the first PRU resource set, where the UCI allocates a second PRU group in the second PRU resource set for the payload of the random access message. The UCI may include at least one of a MCS, a TBS, a waveform, resource allocation information for the payload, a frequency hopping pattern for the payload, or multi-slot repetition information for the payload. For example, referring to FIG. 8, msgA may include a piggybacked UCI 804 including information for configuring the payload 802. The UCI 804 may include the MCS, transport block size (TBS), waveform, resource allocation information of the payload 802, as well as a frequency hopping pattern and/or multiple-slot repetition information for the payload 802. In one example, the determined preamble may be mapped to PRU group 812c in the first PRU resource set 808, and PRU group 812c carries the UCI 804 providing configuration information for the payload 802. The UCI 804 may allocate PRU group 812b of the second PRU resource set 810 to carry the payload 802 of msgA.

In another aspect of the present disclosure relating to PUSCH hopping, the random access message is transmitted according to a frequency hopping pattern using the first PRU resource set and the second PRU resource set. The random access message may be transmitted using a first PRU group in the first PRU resource set in a first frequency of the frequency hopping pattern and using a second PRU group in the second PRU resource set in a second frequency of the frequency hopping pattern. For example, referring to FIG. 9, msgA may include the payload 902, which is transmitted according to a hopping pattern on multiple PRU resource sets 908, 910. In one example, the determined preamble may be mapped to PRU group 912a in the first PRU resource set 908 for carrying the payload 904a of msgA at a first frequency. Moreover, based on either a dynamic or static frequency offset, the PRU group 912a in the first PRU resource set 908 may be mapped to another PRU group 912d in the second PRU resource set 910 for carrying the payload 904b of msgA at a second frequency. The frequency hopping pattern may be obtained in the random access configuration information or may be determined by the UE and/or included in UCI.

In a further aspect of the present disclosure relating to multiple-slot repetition, the random access message may be transmitted according to a multi-slot repetition pattern across the first PRU resource set and the second PRU resource set, where a first transmission of the random access message is using a first PRU group in the first PRU resource set, and a second transmission of the random access message is using a second PRU group in the second PRU resource set. For example, referring to FIG. 10, msgA may include the payload 1002a, which is transmitted in multiple slots 1004a, 1004b on multiple PRU resource sets 1008, 1010. In one example, the determined preamble may be mapped to PRU group 1012a in the first PRU resource set 1008 for carrying the payload 1002a of msgA in a first set of slots 1004a. Moreover, based on a dynamic or static determination of this number of slots, the PRU group 1012a in the first PRU resource set 1008 may be mapped to another PRU group 1012b in the second PRU resource set 1010 for repeating the payload 1002b of msgA in a second set of slots 1004b. The slot-repetition information may be obtained in the random access configuration information or may be determined by the UE and/or included in UCI.

In an additional aspect of the present disclosure relating to a combination of UCI piggybacking and PUSCH hopping and/or multi-slot repetition, UCI may be transmitted in a first PRU group of the first PRU resource set, where the UCI allocates a second PRU group in the second PRU resource set for the payload, and the payload is transmitted in the second PRU group of the second PRU resource set. For example, referring to FIG. 11, msgA may include a piggybacked UCI 1104 including information for configuring the payload 1102. In one example, the determined preamble may be mapped to PRU group 1112c in the first PRU resource set 1108, and PRU group 1112c carries the UCI 1104 providing configuration information for the payload 1102. The UCI 1104 may allocate PRU group 1112b of the second PRU resource set 1110 to carry the payload 1102 of msgA.

Further in accordance with this aspect, the payload may be transmitted using frequency hopping or slot repetition across the second PRU group and a third PRU group in the second PRU resource set. In some aspects, the payload may be transmitted in the second PRU group and the third PRU group based on frequency hopping information in the UCI, wherein the UCI includes one of intra-slot or inter-slot PRB hopping information. In other aspects, the payload may be transmitted in the second PRU group and the third PRU group based on multi-slot repetition information in the UCI, where the payload spans one of multiple consecutive slots or non-consecutive slots in the time domain. For example, referring to FIG. 11, each PRU in the second PRU group 1112b may carry or repeat the payload 1102a of msgA at a first frequency or in a first set of slots. Moreover, based on frequency hopping information or slot-repetition information in the UCI 1104, the second PRU group 1112b in the second PRU resource set 1110 may be mapped to a third PRU group 1112d in the second PRU resource set 1110 for carrying or repeating the payload 1102b of msgA at a second frequency or second set of slots. The hopping pattern may be intra-slot (e.g. the payload transmission may hop frequencies after a certain number of symbols in a slot of a physical resource block (PRB)), or inter-slot (e.g. the payload transmission may hop frequencies after a certain number of slots of one or more PRBs). The multiple-slot repetition of the payload 1002a, 1002b may span consecutive slots or non-consecutive slots of one or more PRBs in the time-domain.

Finally, at 1208, the UE transmits, to the base station, the random access message including the preamble and a payload, where the payload is transmitted using one or more PRU groups of the one or more PRU resource sets based on the mapping. For example, 1210 may be performed by random access message component 1314 in FIG. 13. For instance, referring to FIGS. 4 and 5, the UE may transmit the preamble 410 to the base station followed by the payload 412, which may include, for example, any of an RRC message (similar to message 3 in the four-step RACH process), user plane (UP) or control plane (CP) data, a MAC CE (e.g. buffer status report (BSR) or power headroom report (PHR)), and in certain aspects, piggybacked uplink control information (UCI). When sending msgA, the UE transmits the payload and DMRS on multiple PRUs or PRU groups mapped to the sequence of the single transmitted preamble. Furthermore, referring to FIGS. 8, 9, 10, and 11, the UE may piggyback UCI 804 to a payload in msgA, transmit a payload 902 according to a hopping pattern in msgA, transmit and repeat a payload 1002a, 1002b in msgA using multiple-slot repetition, or combine these procedures based on the one-to-many mapping arrangement between the UE's determined preamble and the multiple PRU groups 812, 912a-d, 1012, 1112.

Figure 13:
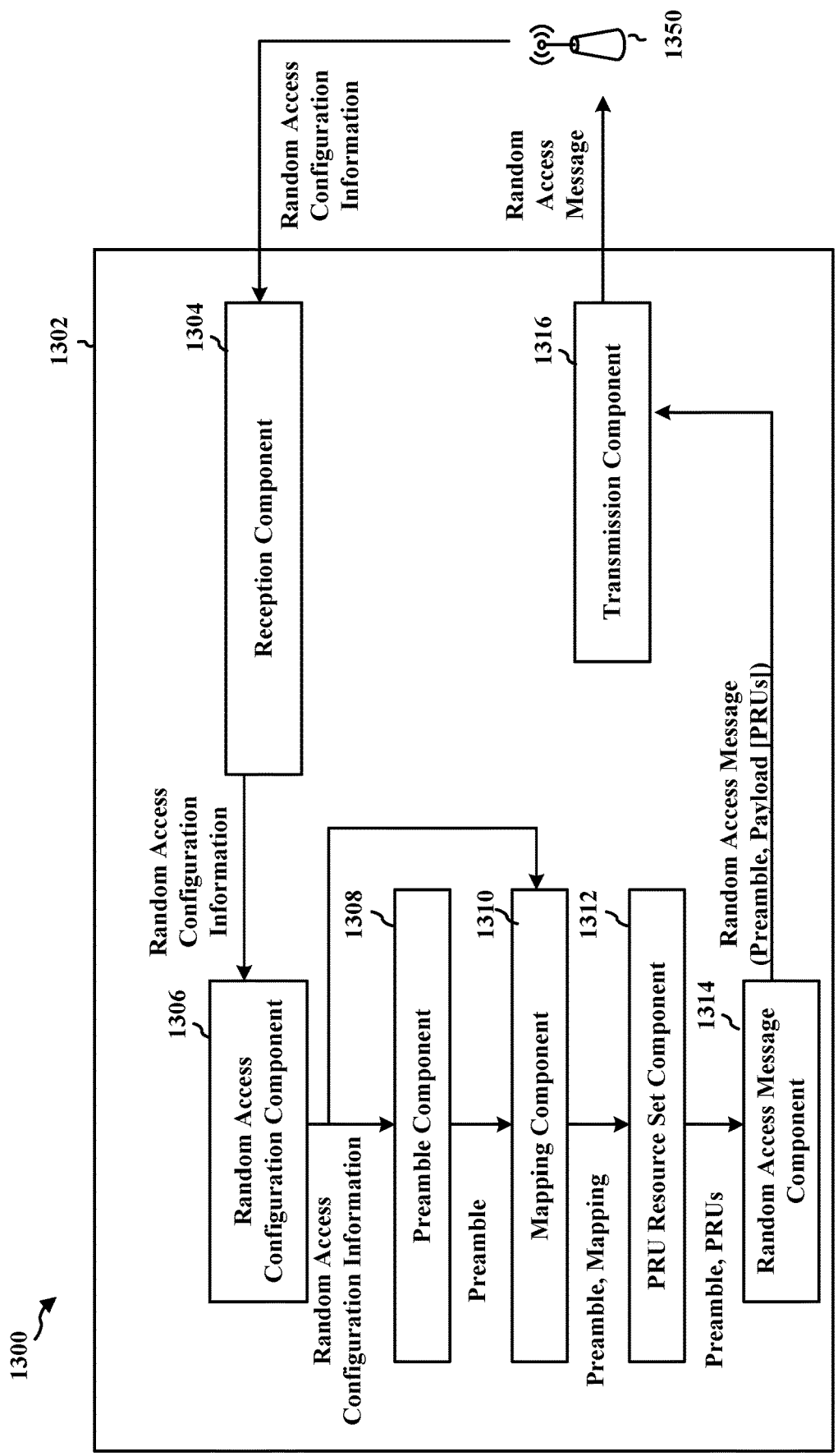
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a UE (e.g. UE 104, 350, 402) or a component of a UE which is in communication with a base station 1350 (e.g. base station 102/180, 310, 404). The apparatus includes a reception component 1304 that receives downlink transmissions, including random access configuration information, from the base station 1350. The apparatus includes a random access configuration component 1306 which receives from the base station 1350, via the reception component 1304, random access configuration information, e.g., as described in connection with step 1202 of FIG. 12. The apparatus includes a preamble component 1308 which determines a preamble for a random access message from a preamble group for a RO, e.g., as described in connection with step 1204 of FIG. 12. The apparatus includes a mapping component 1310 which determines a mapping based on the random access configuration information. The apparatus includes a PRU resource set component 1312 which determines one or more PRU resource sets for the random access message based on the preamble, e.g., as described in connection with step 1206 of FIG. 12. The random access configuration information maps the preamble to the one or more PRU resource sets. The apparatus includes a random access message component 1314 which transmits, to the base station 1350 via a transmission component 1316, the random access message including the preamble and a payload, e.g., as described in connection with step 1208 of FIG. 12. The payload is transmitted using one or more PRU groups of the one or more PRU resource sets based on the mapping at the PRU resource set component 1312. The apparatus includes the transmission component 1316, which transmits uplink communications to the base station 1350, including the random access message from the random access message component 1314.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
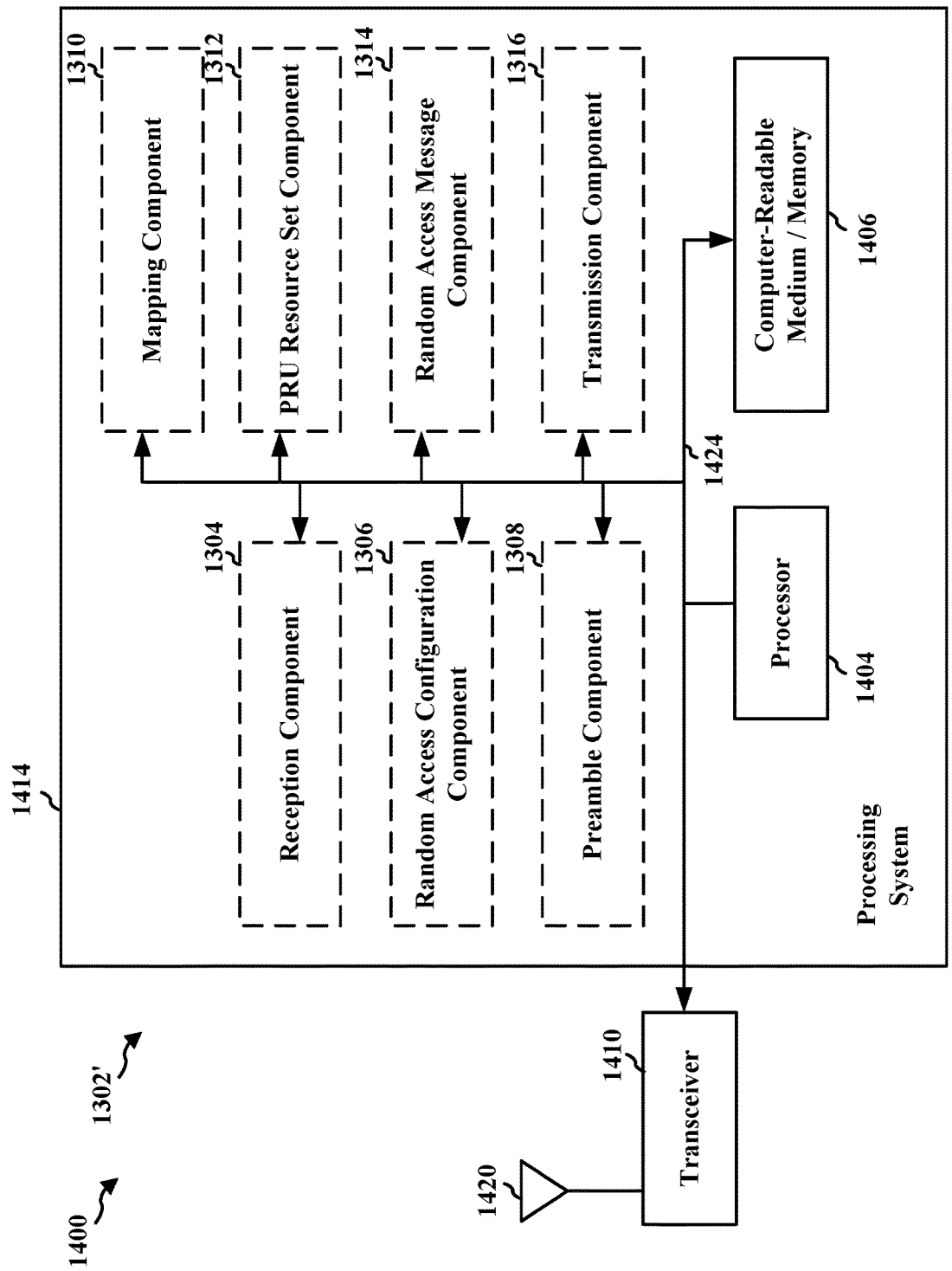
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1316, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. Alternatively, the processing system 1414 may be the entire UE (e.g., see 350 of FIG. 3).

In one configuration, the apparatus 1302/1302' for wireless communication includes means for receiving, from a base station, random access configuration information; means for determining a preamble for a random access message from a preamble group for a random access occasion (RO); the means for determining further configured to determine one or more physical uplink shared channel resource unit (PRU) resource sets for the random access message based on the preamble and a mapping based on the random access configuration information, wherein the random access configuration information maps the preamble to the one or more PRU resource sets; and means for transmitting, to the base station, the random access message including the preamble and a payload, wherein the payload is transmitted using one or more PRU groups of the one or more PRU resource sets based on the mapping.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
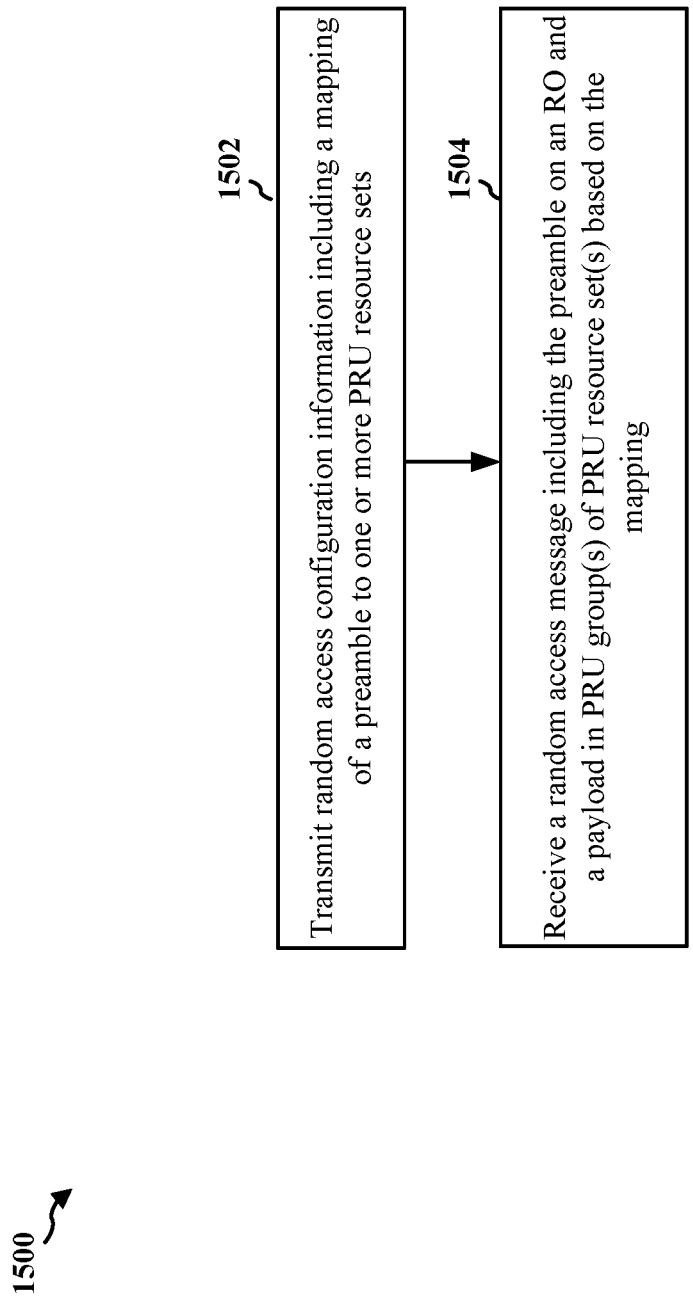
FIG. 15 is a flowchart of a method of wireless communication at a base station.

FIG. 15 is a flowchart 1500 of a method of wireless communication. The method may be performed by a base station 102/180, 310, 404 (e.g., the base station 310; the apparatus 1602/1602'; the processing system 1714, which may include the memory 376 and which may be the entire base station 310 or a component of the base station 310, such as the TX processor 316, the RX processor 370, and/or the controller/processor 375). The method allows a base station to receive msgA transmissions in a two-step RACH process based on a one-to-many mapping arrangement between preambles and PRUs, in which the preamble selected by the UE may be mapped to one or more PRU groups to support UCI piggybacking, PUSCH hopping, and multiple-slot repetition.

At 1502, the base station transmits, to a UE, random access configuration information, where the random access configuration information is transmitted using at least one of system information or RRC signaling. For example, 1502 may be performed by random access configuration information component 1608 in FIG. 16. For instance, referring to FIG. 4, prior to the beginning of a two-step RACH process, the base station may transmit random access configuration information 406 to the UE. For example, the base station may broadcast an SSB, a SIB, and/or a reference signal for the UE to process these signals and channels and determine the configuration for the two-step RACH.

The random access configuration information includes a mapping of a preamble to one or more PRU resource sets (e.g. to PRU groups of the PRU resource sets). The association rule may comprise one-to-many mapping (e.g. one preamble is associated with multiple PRU groups), one-to-one mapping (e.g. one preamble is associated with one PRU group), or many-to-one mapping (e.g. multiple preambles are associated with the same PRU group). For instance, referring to FIG. 7, the random access configuration may indicate that a preamble in preamble group 706 supports a one-to-many mapping arrangement, a one-to-one mapping arrangement or many-to-one mapping arrangement. More particularly, the random access configuration may indicate that some preambles may individually be associated with multiple PRU groups in the same or different PRU resource sets, while other preambles may individually or in a plurality be associated with only one PRU group. Thus, in one example, if one preamble group 706 configured for an RO includes 64 preambles of different preamble sequences, the random access configuration information may indicate that preamble 2 702a is associated with PRU group 712a and PRU group 712b (one-to-many association rule), preamble 3 702b is associated with PRU group 712c (one-to-one association rule) and preamble 4 702c and preamble 5 702d are associated with PRU group 712d (many-to-one association rule).

Finally, at 1504, the base station receives a random access message from the UE including the preamble on a RO, where the preamble is from a preamble group. For example, 1504 may be performed by random access component 1606 in FIG. 16. For instance, referring to FIG. 4, the base station may receive a msgA from the UE including a preamble 410 followed by a payload 412. Moreover, referring to FIG. 6, the preamble which the base station receives may be determined based on the random access configuration information from a preamble group 606, which may include multiple preambles 602 having different preamble sequences that can be received on the same RO 604. In one example, a preamble group 606 may include 64 preamble sequences, and the base station may receive a preamble 602 determined from these sequences on the time and frequency resources associated with the RO 604.

The preamble is associated with one or more PRU resource sets for the random access message based on the mapping. The one or more PRU resource sets may comprise a first PRU resource set and a second PRU resource set. For instance, referring to FIG. 6, the preambles 602 in the preamble group 606 for an RO 604 may be associated with a first PRU resource set 608 and/or a second PRU resource set 610, where each PRU resource set includes one or more groups of PRUs (PRU groups 612) for transmission of a payload in msgA.

In one aspect, the one or more PRU resource sets may comprise a plurality of PRU resource sets associated with the preamble, and the plurality of resource sets are orthogonal in at least one of a time domain, a frequency domain, or a code domain. For instance, referring to FIG. 6, one preamble group 606 for an RO 604 may be associated with multiple PRU resource sets. More particularly, some preambles in a preamble group can be associated with one PRU resource set, while other preambles in the preamble group can be associated with another PRU resource set. The PRU resource sets may be orthogonal in the time, frequency, and/or code domains. For example, FIG. 6 illustrates the first and second PRU resource sets 608, 610 being orthogonal to each other in the time domain 614, although the PRU resource sets can be orthogonal in the frequency domain 616 or code domain as well.

In another aspect, the one or more PRU resource sets may comprise a plurality of PRU resource sets associated with the preamble, and the preamble is associated with multiple PRU groups in a single PRU resource set. For instance, referring to FIG. 6, one preamble group 606 for an RO 604 may be associated with multiple PRU resource sets, and the preamble determined from the preamble group may be mapped to multiple PRUs in the same PRU resource set. For example, one preamble 602a in the preamble group 606 may be mapped to PRU groups 612a and 612c of the first PRU resource set 608, or to PRU groups 612b and 612d of the second PRU resource set 610.

In a further aspect, the one or more PRU resource sets may comprise a plurality of PRU resource sets associated with the preamble, and the preamble is associated with at least one PRU group in different PRU resource sets. For instance, referring to FIG. 6, one preamble group 606 for an RO 604 may be associated with multiple PRU resource sets, and the preamble determined from the preamble group may be mapped to multiple PRUs in different PRU resource sets. For example, one preamble 602a in the preamble group 606 may be mapped to PRU group 612c of the first PRU resource set 608 and PRU group 612d of the second PRU resource set 610, or to any combination of PRU groups 612 and PRU resource sets 608, 610.

According to an aspect of the present disclosure relating to UCI piggybacking, the random access message may comprise UCI received using a first PRU group in the first PRU resource set, where the UCI allocates a second PRU group in the second PRU resource set for the payload of the random access message. For example, referring to FIG. 8, the received msgA may include a piggybacked UCI 804 including information for configuring the payload 802. The UCI 804 may include the MCS, transport block size (TBS), waveform, resource allocation information of the payload 802, as well as a frequency hopping pattern and/or multiple-slot repetition information for the payload 802. In one example, the preamble may be mapped to PRU group 812c in the first PRU resource set 808, and PRU group 812c carries the UCI 804 providing configuration information for the payload 802. The UCI 804 may allocate PRU group 812b of the second PRU resource set 810 to carry the payload 802 of msgA.

In another aspect of the present disclosure relating to PUSCH hopping, the random access message may be received according to a frequency hopping pattern using the first PRU resource set and the second PRU resource set. The random access message may be received using a first PRU group in the first PRU resource set in a first frequency of the frequency hopping pattern and using a second PRU group in the second PRU resource set in a second frequency of the frequency hopping pattern. The payload may be received using frequency hopping in the first PRU group and the second PRU group. For example, referring to FIG. 9, the received msgA may include the payload 902, which is received according to a hopping pattern on multiple PRU resource sets 908, 910. In one example, the preamble may be mapped to a first PRU group 912a in the first PRU resource set 908 for carrying the payload 904a of msgA at a first frequency. Moreover, based on either a dynamic or static frequency offset, the first PRU group 912a in the first PRU resource set 908 may be mapped to a second PRU group 912d in the second PRU resource set 910 for carrying the payload 904b of msgA at a second frequency.

In a further aspect of the present disclosure relating to multiple-slot repetition, the random access message may be received according to a multi-slot repetition pattern across the first PRU resource set and the second PRU resource set, where the random access message is received using a first PRU group in the first PRU resource set in a first slot of the multi-slot repetition pattern and using a second PRU group in the second PRU resource set in a second slot of the multi-slot repetition pattern. The payload may be received using slot repetition in the first PRU group and the second PRU group. For example, referring to FIG. 10, the received msgA may include the payload 1002a, which is received in multiple slots 1004a, 1004b on multiple PRU resource sets 1008, 1010. In one example, the preamble may be mapped to a first PRU group 1012a in the first PRU resource set 1008 for carrying the payload 1002a of msgA in a first set of slots 1004a. Moreover, based on a dynamic or static determination of this number of slots, the PRU group 1012a in the first PRU resource set 1008 may be mapped to a second PRU group 1012b in the second PRU resource set 1010 for repeating the payload 1002b of msgA in a second set of slots 1004b.

In an additional aspect of the present disclosure relating to a combination of UCI piggybacking and PUSCH hopping and/or multi-slot repetition, UCI may be received in a first PRU group of the first PRU resource set, where the UCI allocates a second PRU group in the second PRU resource set for the payload, and where the payload is received in the second PRU group of the second PRU resource set. For example, referring to FIG. 11, the received msgA may include a piggybacked UCI 1104 including information configuring the payload 1102. In one example, the preamble may be mapped to PRU group 1112c in the first PRU resource set 1108, and PRU group 1112c carries the UCI 1104 providing configuration information for the payload 1102. The UCI 1104 may allocate PRU group 1112b of the second PRU resource set 1110 to carry the payload 1102 of msgA.

In some aspects, the payload may be frequency hopped across the second PRU group and a third PRU group in the second PRU resource set. In other aspects, the payload may be repeated across the second PRU group and a third PRU group in the second PRU resource set. For example, referring to FIG. 11, each PRU in the second PRU group 1112b may carry or repeat the payload 1102a of msgA at a first frequency or in a first set of slots. Moreover, based on frequency hopping information or slot-repetition information in the UCI 1104, the second PRU group 1112b in the second PRU resource set 1110 may be mapped to a third PRU group 1112d in the second PRU resource set 1110 for carrying or repeating the payload 1102b of msgA at a second frequency or second set of slots.

The random access message may include the payload received in one or more PRU groups of the one or more PRU resource sets based on the mapping. For instance, referring to FIGS. 4 and 5, the base station may receive a payload 412 following the preamble 410 in msgA, which may include, for example, an RRC message (similar to message 3 in the four-step RACH process), user plane (UP) or control plane (CP) data, a MAC CE (e.g. buffer status report (BSR) or power headroom report (PHR)), and in certain aspects, piggybacked uplink control information (UCI). When receiving msgA, the base station may receive the payload and DMRS on multiple PRUs or PRU groups mapped to the sequence of the single transmitted preamble. Furthermore, referring to FIGS. 8, 9, 10, and 11, the base station may receive piggybacked UCI 804 on a payload in msgA, a payload 902 according to a hopping pattern in msgA, a repeated payload 1002*a*, 1002*b* in msgA using multiple-slot repetition, or a combination based on the one-to-many mapping arrangement between the determined preamble and the multiple PRU groups 812, 912*a-d*, 1012, 1112.

Figure 16:
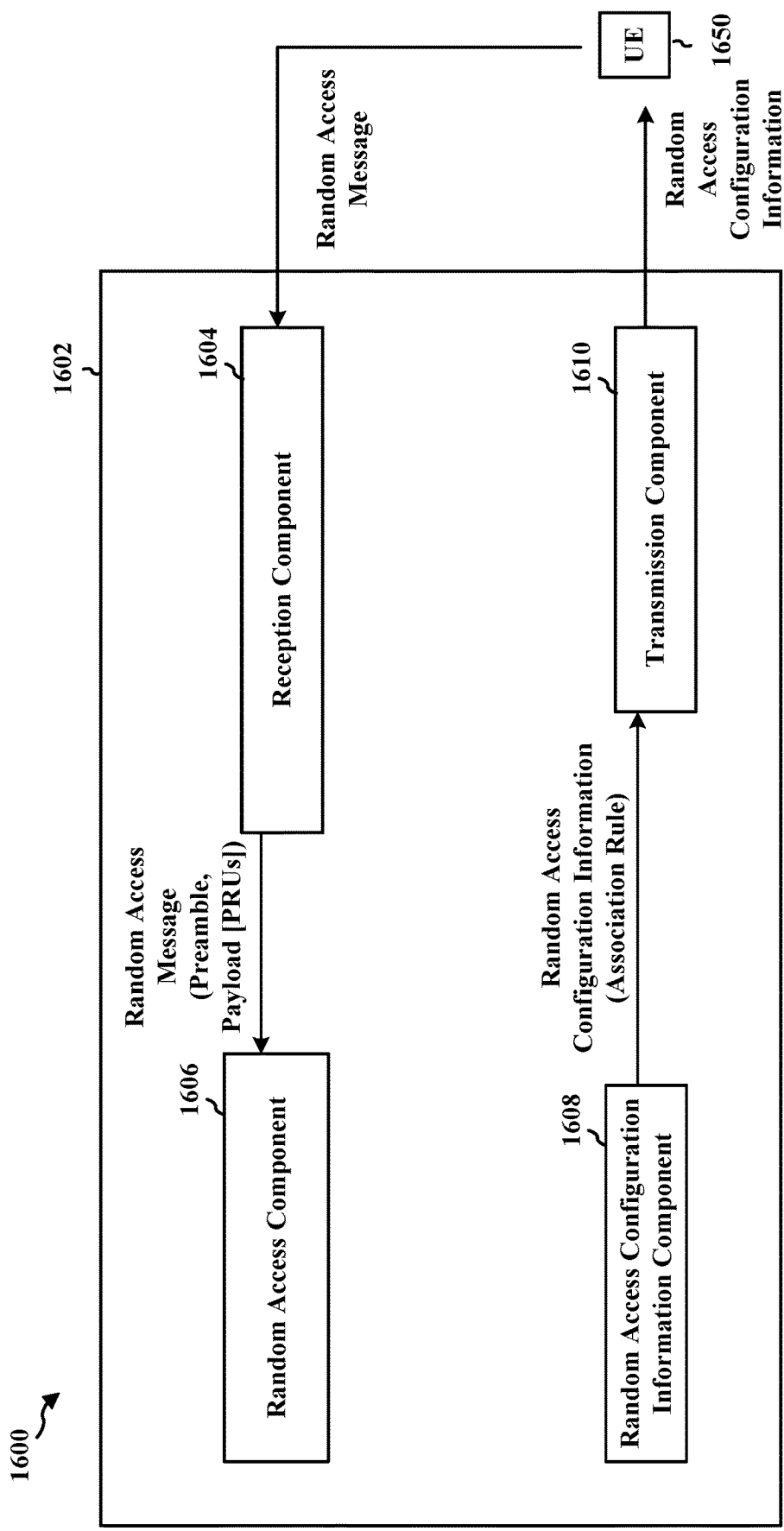
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a base station (e.g. base station 102/180, 310, 404) or a component of a base station, which is in communication with a UE 1650 (e.g. UE 104, 350, 402). The apparatus includes a reception component 1604 that receives uplink communications from the UE, including a random access message into a random access component 1606 of the apparatus 1602. The apparatus includes a random access configuration information component 1608 which transmits to the UE 1650, via a transmission component 1610 of the apparatus 1602, random access configuration information, e.g., as described in connection with step 1502 of FIG. 15. The random access configuration information is transmitted from the random access configuration information component 1608 using at least one of system information or RRC signaling, and the random access configuration information includes a mapping of a preamble to one or more PRU resource sets, e.g., as further described in connection with step 1502 of FIG. 15. The apparatus includes the transmission component 1610, which transmits downlink communications to the UE 1650 including the random access configuration information. Subsequently, the random access component 1606 of the apparatus 1602 receives, via the reception component 1604, a random access message from the UE including the preamble on a RO, e.g., as described in connection with step 1504 of FIG. 15. The preamble is from a preamble group and may be associated with one or more PRU resource sets for the random access message based on the mapping, e.g., as further described in connection with step 1504 of FIG. 15. The random access message includes a payload received by the random access component 1606 in one or more PRU groups of the one or more PRU resource sets based on the mapping.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
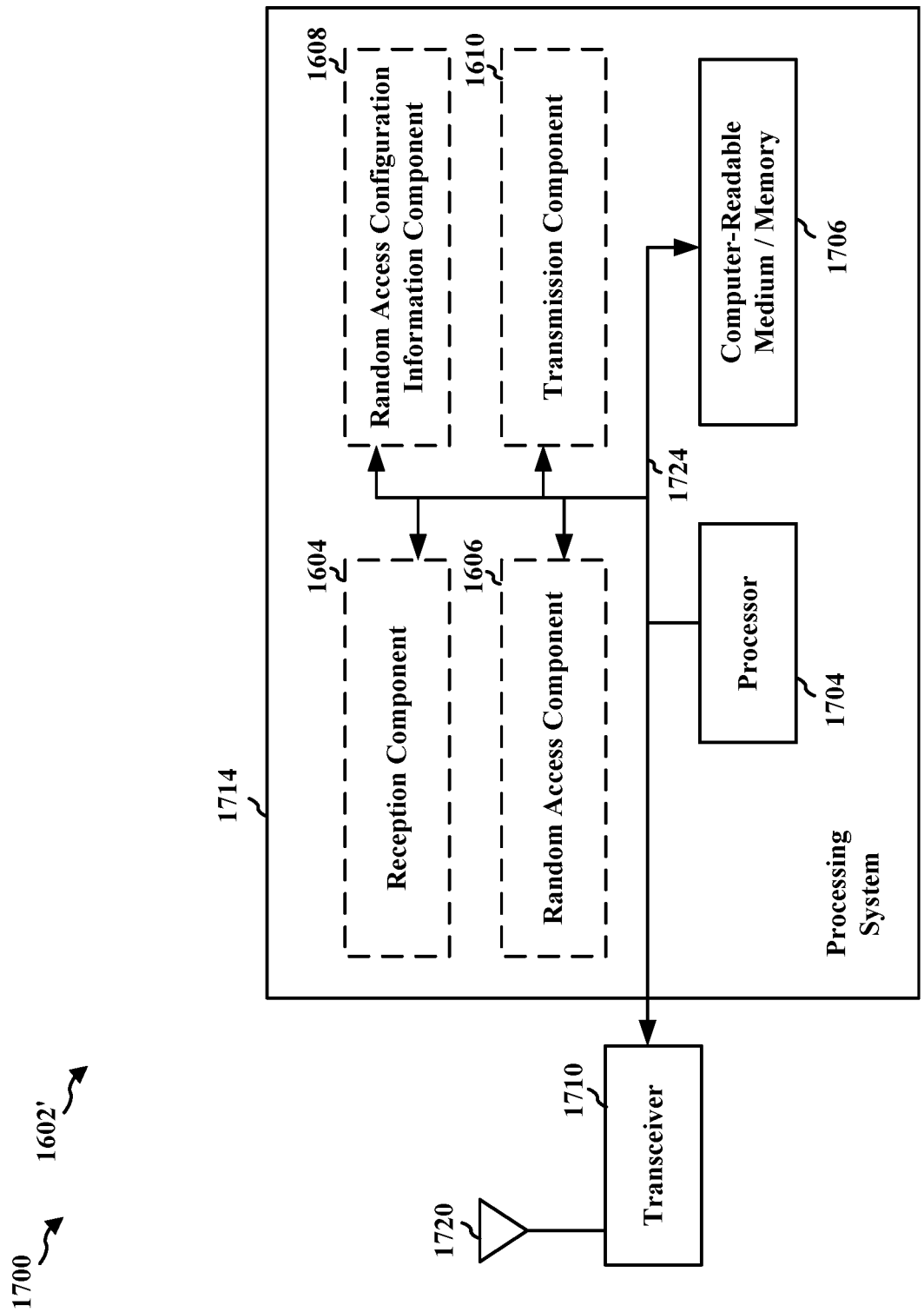
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375. Alternatively, the processing system 1714 may be the entire base station (e.g., see 310 of FIG. 3).

In one configuration, the apparatus 1602/1602' for wireless communication includes means for transmitting, to a user equipment (UE), random access configuration information, wherein the random access configuration information is transmitted using at least one of system information or radio resource control (RRC) signaling, and wherein the random access configuration information includes a mapping of a preamble to one or more PRU resource sets. The apparatus 1602/1602' also includes means for receiving a random access message from the UE including the preamble on a random access occasion (RO), wherein the preamble is from a preamble group, and wherein the random access message includes a payload received in one or more PRU groups of the one or more PRU resource sets based on the mapping.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, the present disclosure supports a variety of payloads for msgA transmission in the two-step RACH procedure by providing a one-to-many mapping arrangement between preambles and PRUs to allow for configurable MCS and configurable resource sizes in the time-frequency domain. The preamble determined by the UE may be mapped to one or more groups of PRUs to support piggybacking of UCI, frequency hopping on PUSCH, and multiple-slot repetition for msgA transmissions. By piggybacking UCI to a payload in msgA, the present disclosure may provide flexibility in the selection of MCS and waveform, as well as provide resource allocation for DMRS and PUSCH in PRUs. Moreover, by allowing a payload to hop to different frequencies on PUSCH during the transmission of msgA, a gain in frequency diversity and interference averaging may be provided. Additionally, by enabling a payload to repeat across multiple slots in msgA transmission, coverage enhancement and/or reliability may be increased.

The following examples are illustrative only and may be combined with aspects of other embodiments or teaching described herein, without limitation.

Example 1 is a method of wireless communication at a UE, comprising: receiving, from a base station, random access configuration information; determining a preamble for a random access message from a preamble group for a random access occasion (RO); determining one or more physical uplink shared channel resource unit (PRU) resource sets for the random access message based on the preamble and a mapping based on the random access configuration information, wherein the random access configuration information maps the preamble to the one or more PRU resource sets; and transmitting, to the base station, the random access message including the preamble and a payload, wherein the payload is transmitted using one or more PRU groups of the one or more PRU resource sets based on the mapping.

In Example 2, the method of Example 1 further includes that the one or more PRU resource sets comprise a first PRU resource set and a second PRU resource set.

In Example 3, the method of Example 1 or 2 further includes that the random access message comprises uplink control information (UCI) transmitted using a first PRU group in the first PRU resource set, and the UCI allocates a second PRU group in the second PRU resource set for the payload of the random access message.

In Example 4, the method of any of Example 1-3 further includes that the UCI includes at least one of a modulation control scheme (MCS), a transport block size (TBS), a waveform, resource allocation information for the payload, a frequency hopping pattern for the payload, or multi-slot repetition information for the payload.

In Example 5, the method of any of Example 1-4 further includes that the random access message is transmitted according to a frequency hopping pattern using the first PRU resource set and the second PRU resource set, wherein the random access message is transmitted using a first PRU group in the first PRU resource set in a first frequency of the frequency hopping pattern and using a second PRU group in the second PRU resource set in a second frequency of the frequency hopping pattern.

In Example 6, the method of any of Example 1-5 further includes that each PRU group of the one or more PRU groups comprises a time-frequency resource associated with a physical uplink shared channel (PUSCH) transmission and an antenna port and sequence scrambling identification associated with a demodulation reference signal (DMRS) transmission.

In Example 7, the method of any of Example 1-6 further includes that the one or more PRU resource sets comprise a plurality of PRU resource sets associated with the preamble group configured for the RO, and wherein the plurality of PRU resource sets are orthogonal in at least one of a time domain, a frequency domain or a code domain.

In Example 8, the method of any of Example 1-7 further includes that the one or more PRU resource sets comprise a plurality of PRUs associated with the preamble group configured for the RO, and wherein the preamble determined by the UE is associated with multiple PRU groups in a single PRU resource set.

In Example 9, the method of any of Example 1-8 further includes that the one or more PRU resource sets comprise a plurality of PRUs associated with the preamble group configured for the RO, and wherein the preamble determined by the UE is associated with at least one PRU group in different PRU resource sets.

In Example 10, the method of any of Example 1-9 further includes that the preamble group comprises a first set of preambles and a second set of preambles, each preamble of the first set of preambles being associated with multiple PRU groups in the one or more PRU resource sets, and at least one preamble of the second set of preambles being associated with a single PRU group in one of the one or more PRU resource sets.

In Example 11, the method of any of Example 1-10 further includes that the one or more PRU resource sets comprise a first PRU resource set and a second PRU resource set, wherein the random access message is transmitted according to a multi-slot repetition pattern across the first PRU resource set and the second PRU resource set, wherein a first transmission of the random access message is using a first PRU group in the first PRU resource set, and a second transmission of the random access message is using a second PRU group in the second PRU resource set.

In Example 12, the method of any of Example 1-11 further includes that the one or more PRU resource sets comprise a first PRU resource set and a second PRU resource set, wherein uplink control information (UCI) is transmitted in a first PRU group of the first PRU resource set, the UCI allocating a second PRU group in the second PRU resource set for the payload, wherein the payload is transmitted in the second PRU group of the second PRU resource set, and wherein the payload is transmitted using frequency hopping or slot repetition across the second PRU group and a third PRU group in the second PRU resource set.

In Example 13, the method of any of Example 1-12 further includes that the payload is transmitted in the second PRU group and the third PRU group based on frequency hopping information in the UCI, wherein the UCI includes one of intra-slot or inter-slot physical resource block (PRB) hopping information.

In Example 14, the method of any of Example 1-13 further includes that the payload is transmitted in the second PRU group and the third PRU group based on multi-slot repetition information in the UCI, wherein the payload spans one of multiple consecutive slots or non-consecutive slots in a time domain.

Example 15 is a device including one or more processors and one or more memories in electronic communication with the one or more processors storing instructions executable by the one or more processors to cause the system or apparatus to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a base station, comprising: transmitting, to a user equipment (UE), random access configuration information, wherein the random access configuration information is transmitted using at least one of system information or radio resource control (RRC) signaling, and wherein the random access configuration information includes a mapping of a preamble to one or more physical uplink shared channel resource unit (PRU) resource sets; and receiving a random access message from the UE including the preamble on a random access occasion (RO), wherein the preamble is from a preamble group, wherein the random access message includes a payload received in one or more PRU groups of the one or more PRU resource sets based on the mapping.

In Example 19, the method of Example 18 further includes that the one or more PRU resource sets comprise a first PRU resource set and a second PRU resource set.

In Example 20, the method of Example 18 or 19 further includes that the random access message comprises uplink control information (UCI) received using a first PRU group in the first PRU resource set, and the UCI allocates a second PRU group in the second PRU resource set for the payload of the random access message.

In Example 21, the method of any of Example 18-20 further includes that the random access message is received according to a frequency hopping pattern using the first PRU resource set and the second PRU resource set, wherein the random access message is received using a first PRU group in the first PRU resource set in a first frequency of the frequency hopping pattern and using a second PRU group in the second PRU resource set in a second frequency of the frequency hopping pattern.

In Example 22, the method of any of Example 18-21 further includes that the payload is received using frequency hopping in the first PRU group and the second PRU group.

In Example 23, the method of any of Example 18-22 further includes that the one or more PRU resource sets comprise a plurality of PRU resource sets associated with the preamble, and wherein the plurality of PRU resource sets are orthogonal in at least one of a time domain, a frequency domain, or a code domain.

In Example 24, the method of any of Example 18-23 further includes that the one or more PRU resource sets comprise a plurality of PRU resource sets associated with the preamble, and wherein the preamble is associated with multiple PRU groups in a single PRU resource set.

In Example 25, the method of any of Example 18-24 further includes that the one or more PRU resource sets comprise a plurality of PRU resource sets associated with the preamble, and wherein the preamble is associated with at least one PRU group in different PRU resource sets.

In Example 26, the method of any of Example 18-25 further includes that the one or more PRU resource sets comprise a first PRU resource set and a second PRU resource set, wherein the random access message is received according to a multi-slot repetition pattern across the first PRU resource set and the second PRU resource set, wherein the random access message is received using a first PRU group in the first PRU resource set in a first slot of the multi-slot repetition pattern and using a second PRU group in the second PRU resource set in a second slot of the multi-slot repetition pattern.

In Example 27, the method of any of Example 18-26 further includes that the payload is received using slot repetition in the first PRU group and the second PRU group.

In Example 28, the method of any of Example 18-27 further includes that the one or more PRU resource sets comprise a first PRU resource set and a second PRU resource set, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is frequency hopped across the second PRU group and a third PRU group in the second PRU resource set.

In Example 29, the method of any of Example 18-28 further includes that the one or more PRU resource sets comprise a first PRU resource set and a second PRU resource set, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is repeated across the second PRU group and a third PRU group in the second PRU resource set.

Example 30 is a device including one or more processors and one or more memories in electronic communication with the one or more processors storing instructions executable by the one or more processors to cause the system or apparatus to implement a method as in any of Examples 18-29.

Example 31 is a system or apparatus including means for implementing a method or realizing an apparatus as in any of Examples 18-29.

Example 32 is a non-transitory computer readable medium storing instructions executable by one or more processors to cause the one or more processors to implement a method as in any of Examples 18-29.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a base station, random access configuration information;
   determining a preamble for a random access message from a preamble group for a random access occasion (RO), wherein the random access message comprises a MsgA of a 2-step random access procedure;
   determining one or more physical uplink shared channel resource unit (PRU) resource sets for the random access message based on the preamble and a mapping based on the random access configuration information, wherein the random access configuration information maps the preamble in the preamble group to a first PRU at a first frequency and a second PRU at a second frequency based on a frequency hop for the MsgA; and
   transmitting, to the base station, the random access message including the preamble and a payload, wherein the payload is transmitted using one or more PRU groups of the one or more PRU resource sets based on the mapping.

2. The method of claim 1, wherein the one or more PRU resource sets comprise a first PRU resource set and a second PRU resource set.

3. The method of claim 2, wherein the random access message comprises uplink control information (UCI) transmitted using a first PRU group in the first PRU resource set, and the UCI allocates a second PRU group in the second PRU resource set for the payload of the random access message.

4. The method of claim 3, wherein the UCI includes at least one of a modulation control scheme (MCS), a transport block size (TBS), a waveform, resource allocation information for the payload, a frequency hopping pattern for the payload, or multi-slot repetition information for the payload.

5. The method of claim 2, wherein the random access message is transmitted according to a frequency hopping pattern using the first PRU resource set and the second PRU resource set, wherein the random access message is transmitted using a first PRU group in the first PRU resource set in the first frequency of the frequency hopping pattern and using a second PRU group in the second PRU resource set in the second frequency of the frequency hopping pattern.

6. The method of claim 1, wherein each PRU group of the one or more PRU groups comprises a time-frequency resource associated with a physical uplink shared channel (PUSCH) transmission and an antenna port and sequence scrambling identification associated with a demodulation reference signal (DMRS) transmission.

7. The method of claim 1, wherein the one or more PRU resource sets comprise a plurality of PRU resource sets associated with the preamble group configured for the RO, and wherein the plurality of PRU resource sets are orthogonal in at least one of a time domain, a frequency domain or a code domain.

8. The method of claim 1, wherein the one or more PRU resource sets comprise a plurality of PRUs associated with the preamble group configured for the RO, and wherein the preamble determined by the UE is associated with multiple PRU groups in a single PRU resource set.

9. The method of claim 1, wherein the one or more PRU resource sets comprise a plurality of PRUs associated with the preamble group configured for the RO, and wherein the preamble determined by the UE is associated with at least one PRU group in different PRU resource sets.

10. The method of claim 9, wherein the preamble group comprises a first set of preambles and a second set of preambles, each preamble of the first set of preambles being associated with multiple PRU groups in the one or more PRU resource sets, and at least one preamble of the second set of preambles being associated with a single PRU group in one of the one or more PRU resource sets.

11. The method of claim 1, wherein the one or more PRU resource sets comprise a first PRU resource set and a second PRU resource set, wherein the random access message is transmitted according to a multi-slot repetition pattern across the first PRU resource set and the second PRU resource set, wherein a first transmission of the random access message is using a first PRU group in the first PRU resource set, and a second transmission of the random access message is using a second PRU group in the second PRU resource set.

12. The method of claim 1, wherein the one or more PRU resource sets comprise a first PRU resource set and a second PRU resource set, wherein uplink control information (UCI) is transmitted in a first PRU group of the first PRU resource set, the UCI allocating a second PRU group in the second PRU resource set for the payload, wherein the payload is transmitted in the second PRU group of the second PRU resource set, and wherein the payload is transmitted using frequency hopping or slot repetition across the second PRU group and a third PRU group in the second PRU resource set.

13. The method of claim 12, wherein the payload is transmitted in the second PRU group and the third PRU group based on frequency hopping information in the UCI, wherein the UCI includes one of intra-slot or inter-slot physical resource block (PRB) hopping information.

14. The method of claim 12, wherein the payload is transmitted in the second PRU group and the third PRU group based on multi-slot repetition information in the UCI, wherein the payload spans one of multiple consecutive slots or non-consecutive slots in a time domain.

15. An apparatus for wireless communication, comprising:
   means for receiving, from a base station, random access configuration information;
   means for determining a preamble for a random access message from a preamble group for a random access occasion (RO), wherein the random access message comprises a MsgA of a 2-step random access procedure;

wherein the means for determining is further configured to determine one or more physical uplink shared channel resource unit (PRU) resource sets for the random access message based on the preamble and a mapping based on the random access configuration information, wherein the random access configuration information maps the preamble in the preamble group to a first PRU at a first frequency and a second PRU at a second frequency based on a frequency hop for the MsgA; and means for transmitting, to the base station, the random access message including the preamble and a payload, wherein the means for transmitting is configured to transmit the payload using one or more PRU groups of the one or more PRU resource sets based on the mapping.

16. The apparatus of claim 15, wherein the one or more PRU resource sets comprise a first PRU resource set and a second PRU resource set.

17. The apparatus of claim 16, wherein the random access message comprises uplink control information (UCI) transmitted using a first PRU group in the first PRU resource set, and the UCI allocates a second PRU group in the second PRU resource set for the payload of the random access message.

18. The apparatus of claim 16, wherein the random access message is transmitted according to a frequency hopping pattern using the first PRU resource set and the second PRU resource set, wherein the random access message is transmitted using a first PRU group in the first PRU resource set in the first frequency of the frequency hopping pattern and using a second PRU group in the second PRU resource set in the second frequency of the frequency hopping pattern.

19. The apparatus of claim 16, wherein the random access message is transmitted according to a multi-slot repetition pattern across the first PRU resource set and the second PRU resource set, wherein a first transmission of the random access message is using a first PRU group in the first PRU resource set, and a second transmission of the random access message is using a second PRU group in the second PRU resource set.

20. The apparatus of claim 16, wherein uplink control information (UCI) is transmitted in a first PRU group of the first PRU resource set, the UCI allocating a second PRU group in the second PRU resource set for the payload, wherein the payload is transmitted in the second PRU group of the second PRU resource set, and wherein the payload is transmitted using frequency hopping or slot repetition across the second PRU group and a third PRU group in the second PRU resource set.

21. An apparatus for wireless communication, comprising:
memory; and
at least one processor coupled to the memory and configured to:
receive, from a base station, random access configuration information;
determine a preamble for a random access message from a preamble group for a random access occasion (RO), wherein the random access message comprises a MsgA of a 2-step random access procedure;
determine one or more physical uplink shared channel resource unit (PRU) resource sets for the random access message based on the preamble and a mapping based on the random access configuration information, wherein the random access configuration information maps the preamble in the preamble group to a first PRU at a first frequency and a second PRU at a second frequency based on a frequency hop for the MsgA; and
transmit, to the base station, the random access message including the preamble and a payload, wherein the at least one processor is configured to transmit the payload using one or more PRU groups of the one or more PRU resource sets based on the mapping.

22. The apparatus of claim 21, wherein the one or more PRU resource sets comprise a first PRU resource set and a second PRU resource set.

23. The apparatus of claim 22, wherein the random access message comprises uplink control information (UCI) transmitted using a first PRU group in the first PRU resource set, and the UCI allocates a second PRU group in the second PRU resource set for the payload of the random access message.

24. The apparatus of claim 22, wherein the random access message is transmitted according to a frequency hopping pattern using the first PRU resource set and the second PRU resource set, wherein the random access message is transmitted using a first PRU group in the first PRU resource set in the first frequency of the frequency hopping pattern and using a second PRU group in the second PRU resource set in the second frequency of the frequency hopping pattern.

25. The apparatus of claim 22, wherein the random access message is transmitted according to a multi-slot repetition pattern across the first PRU resource set and the second PRU resource set, wherein a first transmission of the random access message is using a first PRU group in the first PRU resource set, and a second transmission of the random access message is using a second PRU group in the second PRU resource set.

26. The apparatus of claim 22, wherein uplink control information (UCI) is transmitted in a first PRU group of the first PRU resource set, the UCI allocating a second PRU group in the second PRU resource set for the payload, wherein the payload is transmitted in the second PRU group of the second PRU resource set, and wherein the payload is transmitted using frequency hopping or slot repetition across the second PRU group and a third PRU group in the second PRU resource set.

27. A non-transitory computer-readable medium storing computer executable code, the code when executed by at least one processor cause the at least one processor to:
receive, from a base station, random access configuration information;
determine a preamble for a random access message from a preamble group for a random access occasion (RO), wherein the random access message comprises a MsgA of a 2-step random access procedure;
determine one or more physical uplink shared channel resource unit (PRU) resource sets for the random access message based on the preamble and a mapping based on the random access configuration information, wherein the random access configuration information maps the preamble in the preamble group to a first PRU at a first frequency and a second PRU at a second frequency based on a frequency hop for the MsgA; and
transmit, to the base station, the random access message including the preamble and a payload, wherein the processor transmits the payload using one or more PRU groups of the one or more PRU resource sets based on the mapping.

28. A method of wireless communication at a base station, comprising:
- transmitting, to a user equipment (UE), random access configuration information, wherein the random access configuration information is transmitted using at least one of system information or radio resource control (RRC) signaling, and wherein the random access configuration information includes a mapping of a preamble for a MsgA of a 2-step random access procedure to one or more physical uplink shared channel resource unit (PRU) resource sets, wherein the random access configuration information maps the preamble in a preamble group to a first PRU at a first frequency and a second PRU at a second frequency based on a frequency hop for the MsgA; and
- receiving a random access message from the UE including the preamble on a random access occasion (RO), wherein the preamble is from the preamble group,
- wherein the random access message includes a payload received in one or more PRU groups of the one or more PRU resource sets based on the mapping.

29. The method of claim 28, wherein the one or more PRU resource sets comprise a first PRU resource set and a second PRU resource set.

30. The method of claim 29, wherein the random access message comprises uplink control information (UCI) received using a first PRU group in the first PRU resource set, and the UCI allocates a second PRU group in the second PRU resource set for the payload of the random access message.

31. The method of claim 29, wherein the random access message is received according to a frequency hopping pattern using the first PRU resource set and the second PRU resource set, wherein the random access message is received using a first PRU group in the first PRU resource set in the first frequency of the frequency hopping pattern and using a second PRU group in the second PRU resource set in the second frequency of the frequency hopping pattern.

32. The method of claim 31, wherein the payload is received using frequency hopping in the first PRU group and the second PRU group.

33. The method of claim 28, wherein the one or more PRU resource sets comprise a plurality of PRU resource sets associated with the preamble, and wherein the plurality of PRU resource sets are orthogonal in at least one of a time domain, a frequency domain, or a code domain.

34. The method of claim 28, wherein the one or more PRU resource sets comprise a plurality of PRU resource sets associated with the preamble, and wherein the preamble is associated with multiple PRU groups in a single PRU resource set.

35. The method of claim 28, wherein the one or more PRU resource sets comprise a plurality of PRU resource sets associated with the preamble, and wherein the preamble is associated with at least one PRU group in different PRU resource sets.

36. The method of claim 28, wherein the one or more PRU resource sets comprise a first PRU resource set and a second PRU resource set, wherein the random access message is received according to a multi-slot repetition pattern across the first PRU resource set and the second PRU resource set, wherein the random access message is received using a first PRU group in the first PRU resource set in a first slot of the multi-slot repetition pattern and using a second PRU group in the second PRU resource set in a second slot of the multi-slot repetition pattern.

37. The method of claim 36, wherein the payload is received using slot repetition in the first PRU group and the second PRU group.

38. The method of claim 28, wherein the one or more PRU resource sets comprise a first PRU resource set and a second PRU resource set, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is frequency hopped across the second PRU group and a third PRU group in the second PRU resource set.

39. The method of claim 28, wherein the one or more PRU resource sets comprise a first PRU resource set and a second PRU resource set, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is repeated across the second PRU group and a third PRU group in the second PRU resource set.

40. An apparatus for wireless communication, comprising:
- means for transmitting, to a user equipment (UE), random access configuration information, wherein the random access configuration information is transmitted using at least one of system information or radio resource control (RRC) signaling, and wherein the random access configuration information includes a mapping of a preamble for a MsgA of a 2-step random access procedure to one or more physical uplink shared channel resource unit (PRU) resource sets, wherein the random access configuration information maps the preamble in a preamble group to a first PRU at a first frequency and a second PRU at a second frequency based on a frequency hop for the MsgA; and
- means for receiving a random access message from the UE including the preamble on a random access occasion (RO), wherein the preamble is from the preamble group,
- wherein the random access message includes a payload received in one or more PRU groups of the one or more PRU resource sets based on the mapping.

41. The apparatus of claim 40, wherein the one or more PRU resource sets comprise a first PRU resource set and a second PRU resource set.

42. The apparatus of claim 41, wherein the random access message comprises uplink control information (UCI) received using a first PRU group in the first PRU resource set, and the UCI allocates a second PRU group in the second PRU resource set for the payload of the random access message.

43. The apparatus of claim 41, wherein the random access message is received according to a frequency hopping pattern using the first PRU resource set and the second PRU resource set, wherein the random access message is received using a first PRU group in the first PRU resource set in the first frequency of the frequency hopping pattern and using a second PRU group in the second PRU resource set in the second frequency of the frequency hopping pattern.

44. The apparatus of claim 41, wherein the random access message is received according to a multi-slot repetition pattern across the first PRU resource set and the second PRU resource set, wherein the random access message is received using a first PRU group in the first PRU resource set in a first slot of the multi-slot repetition pattern and using a second PRU group in the second PRU resource set in a second slot of the multi-slot repetition pattern.

45. The apparatus of claim 41, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is frequency hopped across the second PRU group and a third PRU group in the second PRU resource set.

46. The apparatus of claim 41, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is repeated across the second PRU group and a third PRU group in the second PRU resource set.

47. An apparatus for wireless communication, comprising:
   memory; and
   at least one processor coupled to the memory and configured to:
      transmit, to a user equipment (UE), random access configuration information, wherein the random access configuration information is transmitted using at least one of system information or radio resource control (RRC) signaling, and wherein the random access configuration information includes a mapping of a preamble for a MsgA of a 2-step random access procedure to one or more physical uplink shared channel resource unit (PRU) resource sets, wherein the random access configuration information maps the preamble in a preamble group to a first PRU at a first frequency and a second PRU at a second frequency based on a frequency hop for the MsgA; and
      receive a random access message from the UE including the preamble on a random access occasion (RO), wherein the preamble is from the preamble group, wherein the random access message includes a payload received in one or more PRU groups of the one or more PRU resource sets based on the mapping.

48. The apparatus of claim 47, wherein the one or more PRU resource sets comprise a first PRU resource set and a second PRU resource set.

49. The apparatus of claim 48, wherein the random access message comprises uplink control information (UCI) received using a first PRU group in the first PRU resource set, and the UCI allocates a second PRU group in the second PRU resource set for the payload of the random access message.

50. The apparatus of claim 48, wherein the random access message is received according to a frequency hopping pattern using the first PRU resource set and the second PRU resource set, wherein the random access message is received using a first PRU group in the first PRU resource set in the first frequency of the frequency hopping pattern and using a second PRU group in the second PRU resource set in the second frequency of the frequency hopping pattern.

51. The apparatus of claim 48, wherein the random access message is received according to a multi-slot repetition pattern across the first PRU resource set and the second PRU resource set, wherein the random access message is received using a first PRU group in the first PRU resource set in a first slot of the multi-slot repetition pattern and using a second PRU group in the second PRU resource set in a second slot of the multi-slot repetition pattern.

52. The apparatus of claim 48, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is frequency hopped across the second PRU group and a third PRU group in the second PRU resource set.

53. The apparatus of claim 48, wherein uplink control information (UCI) is received in a first PRU group of the first PRU resource set, the UCI allocating a second PRU group in the second PRU resource set for the payload, wherein the payload is received in the second PRU group of the second PRU resource set, and wherein the payload is repeated across the second PRU group and a third PRU group in the second PRU resource set.

54. A non-transitory computer-readable medium storing computer executable code, the code when executed by a processor cause the processor to:
   transmit, to a user equipment (UE), random access configuration information, wherein the random access configuration information is transmitted using at least one of system information or radio resource control (RRC) signaling, and wherein the random access configuration information includes a mapping of a preamble for a MsgA of a 2-step random access procedure to one or more physical uplink shared channel resource unit (PRU) resource sets, wherein the random access configuration information maps the preamble in a preamble group to a first PRU at a first frequency and a second PRU at a second frequency based on a frequency hop for the MsgA; and
   receive a random access message from the UE including the preamble on a random access occasion (RO), wherein the preamble is from the preamble group, wherein the random access message includes a payload received in one or more PRU groups of the one or more PRU resource sets based on the mapping.

55. The apparatus of claim 21, wherein a first set of preambles is associated with at least a first PRU group in the one or more PRU resource sets, and a second set of preambles is associated with at least a second PRU group in the one or more PRU resource sets.

56. The apparatus of claim 21, wherein the MsgA has a configured resource size.

57. The apparatus of claim 21, wherein the MsgA has a configured MCS.

* * * * *